(12) United States Patent
O'Donnell

(10) Patent No.: US 10,956,110 B2
(45) Date of Patent: Mar. 23, 2021

(54) METHOD AND SYSTEM FOR SELF ADDRESSED INFORMATION DISPLAY

(71) Applicant: Eugene M O'Donnell, Fishers, IN (US)

(72) Inventor: Eugene M O'Donnell, Fishers, IN (US)

( * ) Notice: Subject to any disclaimer, the term of this patent is extended or adjusted under 35 U.S.C. 154(b) by 0 days.

(21) Appl. No.: 16/392,879

(22) Filed: Apr. 24, 2019

(65) Prior Publication Data

US 2019/0250870 A1 Aug. 15, 2019

Related U.S. Application Data

(63) Continuation of application No. 14/333,504, filed on Jul. 16, 2014, now Pat. No. 10,324,676.

(60) Provisional application No. 61/847,244, filed on Jul. 17, 2013.

(51) Int. Cl.
| | | |
|---|---|---|
| *G06F 3/14* | (2006.01) | |
| *G09G 3/20* | (2006.01) | |
| *H04M 1/725* | (2006.01) | |
| *H05B 47/19* | (2020.01) | |
| *H05B 47/155* | (2020.01) | |

(52) U.S. Cl.
CPC .......... *G06F 3/1423* (2013.01); *G06F 3/1446* (2013.01); *G09G 3/2085* (2013.01); *H04M 1/7253* (2013.01); *H05B 47/155* (2020.01); *H05B 47/19* (2020.01); *G09G 2300/026* (2013.01); *G09G 2310/02* (2013.01); *G09G 2310/0281* (2013.01); *G09G 2340/14* (2013.01); *G09G 2356/00* (2013.01); *G09G 2370/022* (2013.01); *G09G 2370/04* (2013.01); *G09G 2370/08* (2013.01); *H04M 2250/10* (2013.01)

(58) Field of Classification Search
CPC .... G06F 3/1423; G06F 3/1446; G06F 3/2085; G09G 2300/026; G09G 2310/02; G09G 2310/0281; G09G 2340/14; G09G 2356/00; G09G 2370/022; G09G 2370/04; G09G 2370/08; H04M 1/7253; H04M 2250/10; H05B 47/155; H05B 47/19
See application file for complete search history.

(56) References Cited

U.S. PATENT DOCUMENTS

| | | | | |
|---|---|---|---|---|
| 6,501,441 | B1* | 12/2002 | Ludtke | G09G 5/14 345/1.1 |
| 7,697,925 | B1* | 4/2010 | Wilson | H05B 47/19 455/418 |
| 8,499,038 | B1* | 7/2013 | Vucurevich | H04N 21/6582 709/204 |
| 8,909,299 | B2* | 12/2014 | Mercuri | H04M 3/42 455/566 |
| 9,148,510 | B2* | 9/2015 | Walsh | H04L 67/303 |
| 2003/0017823 | A1* | 1/2003 | Mager | H04M 1/22 455/414.1 |
| 2007/0065010 | A1* | 3/2007 | Shie | G09G 3/001 382/173 |
| 2009/0167483 | A1* | 7/2009 | Jones | H05B 47/155 340/3.7 |
| 2009/0230895 | A1* | 9/2009 | De Prycker | H05B 47/19 315/317 |

(Continued)

*Primary Examiner* — Mihir K Rayan

(57) ABSTRACT

A system and method are described for creation of a mosaic display system. A device is assigned an address which may be used to produce unique sequence of illumination which is based on a code determined by the address. A sequence of images of a number of devices may be used to determine a spatial location associated with a device address.

20 Claims, 21 Drawing Sheets

(56) References Cited

U.S. PATENT DOCUMENTS

| | | | | |
|---|---|---|---|---|
| 2010/0318201 A1* | 12/2010 | Cuppen | ............ | H04N 21/44008 |
| | | | | 700/90 |
| 2012/0165100 A1* | 6/2012 | Lalancette | .............. | A63F 13/44 |
| | | | | 463/42 |
| 2014/0104139 A1* | 4/2014 | Buchner | ................ | G06F 3/1438 |
| | | | | 345/1.3 |
| 2015/0022563 A1* | 1/2015 | O'Donnell | ............ | G06F 3/1446 |
| | | | | 345/690 |

* cited by examiner

TESSERA DEVICE RECORD TABLE
202

| Description | 200a Example Content | 200b Example Content | 200c Example Content |
|---|---|---|---|
| 205 Tessera device ID | 'Bobs iPhone' | 'Tom's Android' | 'Stella's Android' |
| 210 Tessera device address | '9900026515874 2' | '9900003141589 40' | '9800042138147 2' |
| 215 Tessera device type | 'iPhone' | 'Android' | 'Android' |
| 220 Tessera device display files | 'DisReq1Bob'siPhone'; 'Disreq4Bob'siPhone' | 'DisReq4Tom'sAndroid' | 'DisReq1Stella'sAndroid'; 'DisReq8Stella'sAndroid' |
| 225 Tessera device user information | 'male'; '28'; 'Bob@iphone.com' | 'male'; '55'; 'Tom@android.com' | 'female'; '28'; 'Stella@android.com' |
| 230 Tessera device status | 'inactive' | 'receiving files' | 'accepting notifications'; 'active' |

FIG. 2

DISPLAY FILE RECORD TABLE
302

| | Description | Example Content 300a | Example Content 300b |
|---|---|---|---|
| 305 | Display file ID | 'DisReq1Bob'siPhone' | 'DisReq4Tom'sAndroid' |
| 310 | Display file source device | 'authorized user 1'; 'Bob'siPhone' | 'authorized user 4'; 'Tom'sAndroid' |
| 315 | Display file target mosaic | 'File300' | 'FileAB' |
| 320 | Display file content | 'Rasta man parrot' | 'American flag' |
| 325 | Display file start information | 'at start of song 3' | '17:00:01' |
| 330 | Display file stop information | 'end of song 3' | '17:0:04' |
| 335 | Display file metadata | '05/14/2013'; '14:00:00'; 'Bankers Life Fieldhouse'; 'Margaritaville' | '07/04/2013'; '16:00:05'; 'Lucas Oil Stadium'; 'Start of Colts v. Browns' |

FIG. 3

DETECTION FILE RECORD TABLE
402

| Description | 400a Example Content | 400b Example Content | 400c Example Content |
|---|---|---|---|
| 405 Detection file ID | 'BankersLifeBuffettCamera1' | 'LucasOilStadiumCamera5' | 'AssemblyHallCameras' |
| 410 Detection file name | 'BankersLife Buffet North Stands' | 'Lucas Oil Sprint Gate' | 'AssemblyHallSection16'; 'AssemblyHallSection10' |
| 415 Detection file source device ID | 'HDCam1' | 'HDCam5' | 'HDCam16'; 'HDCam10' |
| 420 Detection file acquisition information | '1920:1080'; '60Fps'; '16:9' | '1920:1080'; '70Fps'; '4:3' | '1280x720', '60Fps'; '16:9' |
| 425 Detection file content | 'https://buffetproductions/bankerslife_07_13_2013_09_20_00' | 'https://coltsgames/lucasoilstadium.com' | 'http://events_assemblyhall.com' |
| 430 Detection file user information | 'BuffettProductions' | 'ColtsManager' | 'IUBasketballCoach' |
| 435 Detection file profile information | '05/10/2013'; '15:01:25'; 'professional video'; 'Jimmy Buffett Concert' | '04/02/2010'; '12:27:10' 'professional video'; 'Colt's game' | '10/15/2011'; '13:17:07'; 'professional video'; 'Ohio State v. IU basketball' |
| 440 Detection file mosaic ID | 'File300' | 'FileAB' | 'File2A' |

FIG. 4

MOSAIC FILE RECORD TABLE
502

| | Description | Example Content | Example Content | Example Content |
|---|---|---|---|---|
| | | 500a | 500b | 500b |
| 505 | Mosaic file ID | 'File300' | 'FileAB' | 'File2A' |
| 510 | Mosaic file detection ID | 'BankersLifeBuffettCamera1' | 'LucasOilStadiumCamera5' | 'AssemblyHallCameras' |
| 515 | Mosaic file description | 'Banker's Life Jimmy Buffett Concert' | 'Lucas Oil Stadium Colts Game' | 'Assembly Hall IU home basketball' |
| 520 | Mosaic file tessera ID | 'Bob'siPhone'; 'David'sAndroid'; 'Joan'siPad', .... | 'Tom'sAndroid'; 'Jill'sG4'; 'Chris'sTablet'; ..... | 'Bob'siPhone'; 'Stella'sAndroid'; 'Matt'siPad'; ...... |
| 525 | Mosaic file spatial data | '(1915,1050)'; '(1875,1060)'; '(1800,1000)'; .... | '(1000,1075)'; '(1900,1050)'; '(1850,750)'; .... | '(1200,700)'; '(1020,750)'; '(750,1000)'; .... |
| 530 | Mosaic file profile | 'concerts'; 'tablets'; 'BankersLife concert seating chart | 'sporting events'; 'cellular phones'; 'computer monitors'; 'Colts game' | 'concerts'; 'sporting events'; 'Ohio State v. IU' |

METHOD AND SYSTEM FOR SELF ADDRESSED INFORMATION DISPLAY

BACKGROUND

1. Field of the Invention

The present invention is related to lighting systems and information display by a group of devices.

2. Description of the Related Art

In many instances, it is desirable that a large display can be created from an array of independent elements. Some examples include display lighting and lighting for entertainment stages. Large displays are typically limited by the size of panels which can be fabricated such as LCD panels or LED sign boards. Such systems have advantages, but may be limited for various reasons.

In entertainment venues and artistic applications, there is the disadvantage that the cost of such displays may be high, but the usage may be comparatively low. Further there is no known way in which lighting can be placed in the areas of a stadium in which fans are located without blocking the view.

Due to these and other problems a method and system for a self-addressed information display would be greatly appreciated.

SUMMARY

A device which includes a light emitter is assigned an address. A light pattern is generated by the device which describes the address of the device based on the emitted pattern. An imaging device obtains illumination and/or chromatic information based on images of a group of devices which are emitting address based patterns. The images are analyzed to determine a spatial location associated with the device address.

A device which emits light may be a wireless device such as a cell phone, tablet, portable computer, etc. Any device which can receive information and produce a temporal and/or chromatic sequence may be included in a self-addressed display. An image may be displayed on a group of addressable lighting devices based on a file which defines a luminance and chrominance value which is to be produced. A moving image may be defined based on a sequence of luminance and chrominance values.

Identification of a lighting device may be based on suppression of unwanted sources such as background items which are not controlled by a display controller. A temporal pattern emitted by a lighting device may be used to differentiate active elements of a display group from background light. Synchronization of independent lighting devices may be achieved based on encoded start and stop times which are included in a temporal pattern based on a device address. A temporal pattern for identifying a device may include grayscale and/or chromatic components which may decrease time required for detection of a device and/or improve background noise suppression. An imaging device and/or a server may process images to determine spatial locations and/or to generate files which are delivered to devices included in a display array in order to produce a desired image.

BRIEF DESCRIPTION OF THE DRAWINGS

Aspects and advantages of the system will become apparent and more readily appreciated from the following description of the embodiments, taken in conjunction with the accompanying drawings, of which:

FIG. 2 illustrates a database for a lighting device record.
FIG. 3 illustrates a database for a pattern file record.
FIG. 4 illustrates a database for an image file record.
FIG. 5 illustrates a database for a mosaic record.
FIG. 18 is an exemplary pixel data diagram for a portion of the images in FIG. 17.

DETAILED DESCRIPTION OF THE PREFERRED EMBODIMENTS

Figure 1:
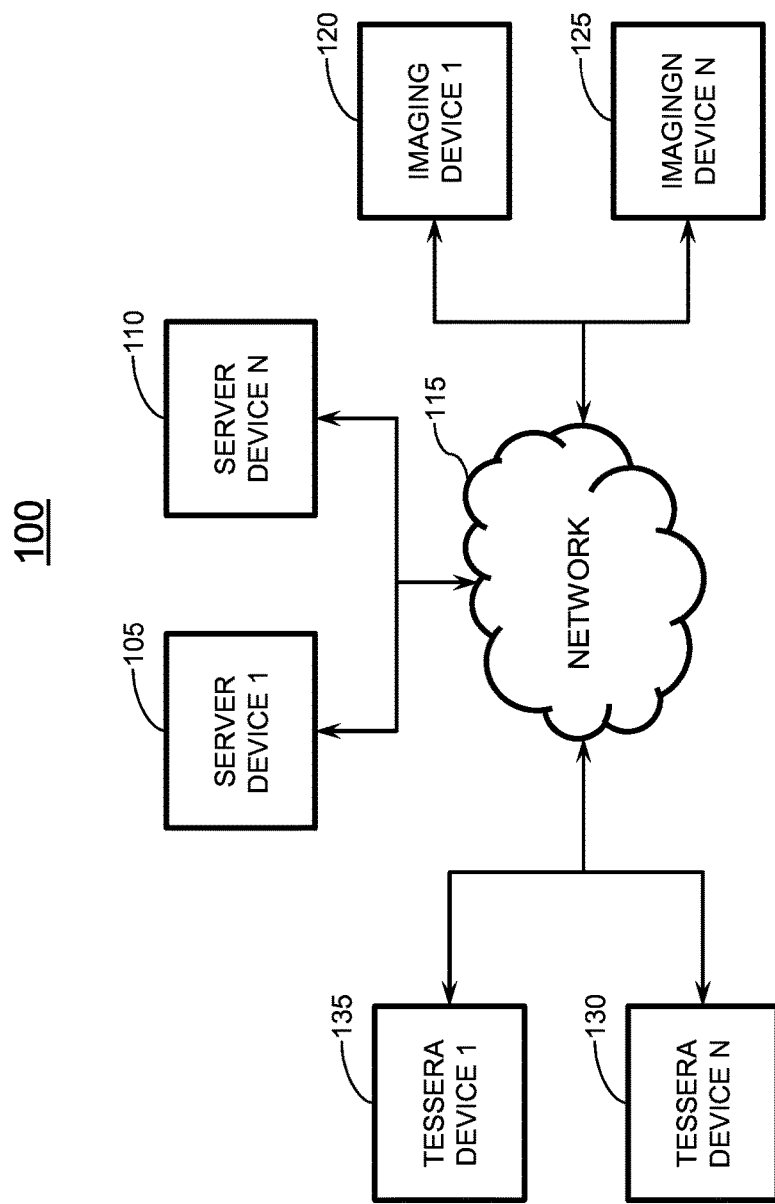
FIG. 1 is a block diagram of an exemplary system embodiment.

Reference will now be made in detail to the present embodiments discussed herein. Examples are illustrated in the accompanying drawings, wherein like reference numerals refer to like elements throughout. The embodiments are described below to explain the disclosed system and method by referring to the figures. It will nevertheless be understood that no limitation of the scope is thereby intended, such alterations and further modifications in the illustrated device, and such further applications of the principles as illustrated therein being contemplated as would normally occur to one skilled in the art to which the embodiments relate. As used herein, words importing the singular shall include the plural and vice versa unless specifically counter indicated.

A system is provided which includes a lighting device for displaying a light stream, a server for receiving the device addresses and messages, a network for sending information and an imaging device to capture an image.

In at least one embodiment an app is created which may perform like a 'flashlight' app or a slide show on a wireless display device (e.g., cell phone). An app can render an image on a device display and/or elements such as an LED flash illuminator, which is preferably a full screen of a controllable color. An app can control the color, brightness, and duration of an image display. An app can receive an address and can receive a sequence of images which are to be displayed. A device is assigned a unique address. A device which is part of an array of devices on which information is displayed may be referred to as a "tessera" (plural tesserae). A tessera may be any sort of device which can be assigned an address, receive instructions for creating a sequence of light output, and produce a light output sequence. Tesserae may include devices such as a mobile computing device such as a cell phone, tablet computer, portable PC, etc., may be wired devices such as the lighting devices described in U.S. Pat. No. 8,427,274, and/or devices controlled by computing devices such as clothing or apparel which comprise lighting elements, etc.

An address assigned to a tessera is preferably unique. An address may include any number of bits however a longer address may require a greater amount of time to be detected. An address recognition pattern for a tessera may be binary (on or off), may include gray-scale (i.e., a varying brightness level), and/or color information. For example, a 16-bit binary scheme provides 64K addresses in a given time period per bit. If a sequence of colors is displayed by tesserae based on the unique address (8 colors=Black, Blue, Magenta, Red, Yellow, Green, Cyan, White) corresponding to the digits 0-7, this produces 8"16 (200 Trillion) addresses in the same time. If each color is displayed for 500 milliseconds, it takes 8 seconds for a camera to determine a unique address assigned to every tessera in the field of view of a camera. This would allow construction of a spatial map of each device and its corresponding address. A larger number of hues such as half-tones of the R, G, B primaries might be used to reduce a time interval required to perform address and location detection. A monochrome sequence which is binary, half-tone or gray scale may also be used at the expense of duration of an address recognition sequence.

Display of an address sequence can be initiated in various ways. For example, an in-app notification, a detected flash pattern from a mapping camera, a user input synchronized to a master clock, an audio trigger, and/or other signal may be used to initiate reproduction of an address identification sequence.

An imaging device may be used to determine a spatial location associated with tesserae in a field of view of an imaging device. An imaging device may be a video camera, a cell phone video device, and/or any device which can acquire a sequence of images with sufficiently high sampling rate to detect an address identification sequence. An imaging device may record a time-stamp associated with a start and end of an image sequence. After acquisition of an image sequence, an image sequence may be uploaded to a server device for further processing, or may be processed by an imaging device. A group or mosaic of tesserae may exceed a field of view and/or resolution capacity of a single imaging device. In such an instance, multiple imaging devices may acquire overlapping images of tesserae which may be identified based on the address identification sequences associated with the redundantly imaged tesserae. Such overlapping may be used for redundancy and/or depth corrections. For example, if a plurality of cell phones acquire images which include common groups of tesserae the overlapping areas can reduce distortions caused by acquisition of 3D data by 20 imaging devices.

Synchronization is a problem with current mosaic lighting systems. For example, a system has been deployed by Wham City Lights wherein an ultrasonic sync signal is used to play a sequence of color fields. However, such a system has limitations since each device must play an identical sequence, and synchronization travels at the speed of sound. This would make display of text, numbers, images, etc. unworkable. In the new system, synchronization may be achieved optically based on an image sequence, which may be a detection sequence. Devices such as cellular phones may be synchronized within one to two seconds based on a cell phone tower. Similarly, a computing device may obtain time information from internet sources. However, a one or two second synchronization error would be readily visible to an observer. In order to overcome this problem and others, a start sequence is inserted in an address recognition sequence. When displaying an address sequence, a tessera device starts at the same time as others according to its local clock, within one frame time. A video clip or image sequence acquired by an imaging device can be used to determine the actual difference in start time between respective tesserae based on an observed start of the start sequence of the address sequence. Thus when a file for reproducing an image is delivered to a tessera a timing offset which delays or advances initiation of a display sequence may be applied appropriately.

A server may be employed to perform more computation intensive activities such as address detection, overlap detection, image skew removal and scaling, mapping to known geometry and/or spatial information of a location, display target reception, serialization of content files for tesserae, and other administrative activities as further described herein.

The system can be used on a smaller scale for 'flash mobs' where people want to create a particular effect ad-hoc. So long as there is a camera which can view the displays at a suitable angle, a pattern can be presented. In such an instance, a phone app may be used to perform any or all of the server functions.

Based on a tessera's unique address, tracking of activities is possible. For example, if a tessera of a given address is detected at an event a user associated with the tessera may be determined to be interested in similar events. For example, if a tessera is detected at a college football game, a user associated with a tessera might be likely to attend a college basketball game including the same school. Promotional or other materials associated with events at that college might be provided to a user after some number of detections of a tessera. No identifying information is exposed regarding a user, but there might be an opt-in by a user for such information to be used in any case.

While a stadium has been used for the purposes of illustration, any type of devices might be synchronized and addressed. For example, computer monitors might be assigned addresses without the need to identify them individually. A 'screen saver' might be used to produce a promotional message by placing monitors appropriately in an office building. Any type of controllable display device which can receive a message and produce a sequence of outputs could be used as a tessera. For example, a low cost device composed of a receiver, a light emitting device, a micro controller and a power source might be used as a tessera which could be provided to persons who did not have a suitable device. Similarly, simple devices which include lighting such as LED's might be controlled by a tessera device which has greater processing power. For example, a hat, bracelet, medallion, and/or other clothing or apparel might be controlled by wireless signals from a mobile phone which would cause appropriate display of information.

As illustrated in FIG. 1, system 100 includes servers 105, 110, a network 115 such as the Internet, tessera devices 130, 135 and imaging devices 120, 125.

A user device such as the imaging device 120 may submit a request to a server such as the server 105. A user device may request that a pattern be displayed using a group of tessera devices or "tesserae". A user device may submit a display file or display request. A display file may comprise a spatial and/or temporal pattern which is to be reproduced by a designated group of tesserae. A display file may include timing information such as a start time, stop time, start condition, stop condition, etc. A user device may submit a detection file or detection request. A detection request may include a number of images which includes illumination information indicating a target group of tesserae. A detection request may comprise information such as a location (e.g., GPS coordinates, IP address, location name), temporal data (start, stop, local time), device information (image resolution, frame rate, etc.), and other such data as may be useful for detection of addresses and spatial locations of tesserae.

A tesserae device such as the tesserae devices 130, 135 (FIG. 1) may receive information such as a file from a server and/or a user device. A tessera device may receive a serial display file. A serial display file may include information such as a file name, start time and/or condition, end time and/or condition, location, image content, duration, and other information required to reproduce a portion of a display request assigned to a tessera device. A tessera device may provide information such as a file to a server. For example, a tessera device may deliver status information, user inputs, user data, etc. to a server and/or user device. A device may function as an imaging device and a tessera device. For example, a device which can acquire an image and reproduce brightness data such as a mobile phone or a tablet or computer may function as both an imaging device and a tessera device.

The network 115 may be a global public network of networks (i.e., the Internet) and/or may consist in whole or in part of one or more private networks and communicatively couples the servers 105, 110, the tessera devices 130, 135, and the imaging devices 120, 125 with each other. The network 115 may include one or more wireless networks such as WiFi, 4G data services, Zig Bee, Blue Tooth, Near-field Communication (NFC), etc., which may enable wireless communication between the various elements of the system 100.

The servers 105, 110, the imaging devices 120, 125, the tessera devices 130, 135 and the network 115 may include equipment, software, systems and personnel required to send and/or receive messages between the servers 105, 110, imaging devices 120, 125, tessera devices 130, 135 and the network 115.

A server, a tessera device, and/or an imaging device may be a desktop, portable, or tablet PC or MaC®, a mobile phone, a smart phone, a PDA, a server system, a specialized communication terminal, a terminal connected to a mainframe, a dedicated lighting device, or any suitable communication hardware and/or system. For example, servers such as the PowerEdge® 2900 by Dell, or the BiadeCenterJS22 by IBM, or equivalent systems which might use an operating system such as Linux, Windows® XP, etc. might be used as the servers 105, 110. After being presented with the disclosure herein, one of ordinary skill in the relevant art will immediately realize that any viable computer systems or communication devices known in the art may be used as servers, imaging devices and tessera devices. While only a few servers, imaging devices and tessera devices are depicted in FIG. 1, it is envisioned that many servers, imaging devices and tessera devices may be used. The servers 105, 110 may include storage devices which may record information in a database which may be a separate device from the servers 105, 110. Records maintained in a database may be stored in any typical manner, including in a Network Attached Storage (NAS), a Storage Area Network (SAN), etc. using any typical or proprietary database software such as DB2®, Informix®, Microsoft® SQLServer™, MySQL®, Oracle®, etc., and may also be a distributed database on more than one server.

In at least one embodiment, a tessera device and/or an imaging device may request and/or receive an application or "app" from a server such as the server 110 (FIG. 1) which may be resident in and operative on a tessera device and/or an imaging device.

As illustrated in FIG. 2 a tessera device record table 202 which may comprise a number of tessera device records 200 is provided. One or more tessera device records may be associated with the servers 105, 110 (FIG. 1). The tessera device record table 202 may include information of tessera devices. The tessera device records 200*a*-*c* may include a tessera device ID field 205, a tessera device address field 210, a tessera device type field 215, a tesserae device display files field 220, a tessera device user information field 225, and a tessera device status field 230.

The tesserae device ID field 205 may include information of a tessera device 10. A tessera device ID is preferably unique and used consistently. A tessera device 10 may be used to identify a particular device, and serves to distinguish a tessera device record associated with a tessera device from tessera device records associated with other tessera devices. For example, 'Bob's iPhone' is the tessera device 10 associated with the tessera device record 200*a*. A tessera device 10 may be associated with an app which is resident on a tessera device, and may be based on a hardware address of a device such as IMEI, etc.

The tessera device address field 210 may include information of an address for a tessera device. An address for a tessera device is preferably unique and used consistently. A tesserae device 10 may be used in conjunction with a device ID to communicate through the network 115. An address may be assigned to a cellular phone, a tablet, or any other communication device which has an address via which communication is enabled. An address may be used to synchronize a series of devices and/or to allow multiple devices to communicate to produce a display. A tesserae device address may be used to determine an image and/or sequence of images which may be produced to assist in identification of a tesserae device. For example, in FIG. 2 the device address '990000314158940' is associated with 'Tom's Android' as indicated by the tessera device record 200*b*. In an embodiment a device address may be used to track interests of a user. For example, if a device is detected at an NFL game it may be determined a user may be interested in college football as well. Promotional materials of college football in an area may be provided to a tessera device by for example messages in an app.

The tessera device type field 215 may include information of a device type. A device type may be any form of a communication device for example, a desktop, a laptop, a watch, a cellular phone, a digital camera etc. As illustrated in FIG. 2, 'Android' is associated with the device 'Stella's Android' as illustrated in the tesserae device record 200*c*. A device type allows a user and/or a network receiver to know information about a device based on industry standards for a device. For example, a model number of a mobile phone, a tablet device, etc. might be detected by an app, which might be used to determine features of a device such as display size, memory capacity, camera features, optical outputs such as a flash LED, etc., audio inputs and outputs, communications types, operating system, display type, installed apps, etc. which may be used for various purposes.

The tessera device display files field 220 may include information of files present on a tessera device. A file to be displayed may include any image, sound, etc. to be used as part of a display request, a screen saver, a video clip, etc. A display file may contain information concerning the type, when, where and how information may be displayed for a user as further described herein. For example 'Bob's iPhone' may have received the display files 'DisReq1 Bob'siPhone' and/or 'DisReq4Bob'siPhone' as illustrated in the tesserae device record 200*a* (FIG. 2). This may indicate that 'Bob's iPhone' has received instructions for display of 'DisReq1' and 'DisReq4'.

The tessera device user information field 225 may include information of a tessera device user. Information such as gender, age, and contact information may be included in the tessera device user information field 225. Information included in the tessera device user information field 225 may be used to determine location, preferences, demographic etc. of a user, and to provide a user with information that may be of greater interest to a particular user. User information may be provided by a user and/or may be inferred based on user actions and historical information. For example, the user of 'Tom's Android' is a 'male', age '55', and his email is.Tom@android.com•.

The tessera device status field 230 may include information on the status of a device. A device may for example be active, accepting files, accepting notifications, receiving a file, transmitting a file, in standby, in-app, out-of-app, etc. Status of a device may be a way to determine whether a user of a device is interested in information at a given time or a user is busy and/or not active. For example, 'Stella's Android' is 'accepting notifications' and 'active' indicating that 'Stella's Android' is interested in receiving notifications and is able to display and/or receive information such as a display request.

As illustrated in FIG. 3 a display file record table 302 which may comprise a number of display file records is provided. One or more may display file records may be associated with or stored in the servers 105, 110 (FIG. 1). The display file record table 302 may include information of display files which may be used to reproduce an element of a display assigned to a tessera device based on a display request. The display file records 300*a-c* may include a display file ID field 305, a display file source device field 310, a display file target mosaic field 315, a display file content field 320, a display file start information field 325, a display file stop information field 330, and a display file metadata field 335.

The display file ID field 305 may include information on a display file. A display file ID is preferably unique and used consistently. A display file ID may indicate a name assigned to a display file generated by a user. A display file ID serves to distinguish a display file record associated with a display file from display file records associated with other display files. For example, the display file record 300*a* is associated with the display file ID 'DisplayReq1 Bob'siPhone'. This may indicate the display file may be directed to 'Bob's iPhone' to reproduce the image associated with 'Display Request1'.

The display file source device field 310 may include information on a display file source device. A display file source device may include information on a user such as a username, authorization etc. For example, 'authorized user I' is associated with display file record 300*a*. This may indicate that 'authorized user I' has directed 'DisReq1 Bob'siPhone' to 'Bob'si Phone'.

The display file target mosaic field 315 may include information of a mosaic of tessera devices to which a display request is targeted. For example, a mosaic record ID may be indicated in the display target mosaic field 315 which may indicate information of devices associated with a display request. Elements of a mosaic identified in a display file may receive a portion of an image which is to be displayed. For example 'Bob'siPhone' may be an element of the mosaic 'File300'.

The display file content field 320 may include information of content. Content may include a video, a picture, audio, text, graphics, etc. which may be provided by a tessera device. For example, 'American flag' as indicated in the display file record 300*b* may be content which is displayed during the playing of the National Anthem at a sporting event. A display file may be decimated spatially and/or temporally to produce display files for tessera devices in a mosaic as specified in the display file target mosaic field 315.

The display file start information field 325 may include information of a start condition. A display file may be selected to start based on various conditions such as at the beginning of a song based on audio recognition, at the sound of an audio tone, at a specified time, at a detected visible event using a device optical pick-up, responsive to a notification, a text message, etc., alone or in any combination. For example, the content 'American flag' may be defined to begin at '17:00:01' correlating to a start time of a sporting event. A start condition may be based on any number of events and/or triggers.

The display file stop information field 330 may provide information of a display file stop condition. A display may be determined to stop based on various conditions such as at the end of a song based on audio recognition, at the end of an event based on temporal information, at a specified time, at a detected visible event using a device optical pick-up, responsive to a notification, a text message, etc., alone or in any combination. For example, 'Rasta man parrot' associated with the display file record 300*a* is defined to stop playing at 'the end of song 3' which may indicate that 'Rasta man parrot' should run throughout the duration of song 3. A stop condition may be based on any number of events and/or triggers.

The display file metadata field 335 may include information of display file metadata. Metadata information may include the date and time a file was created and/or uploaded to the network. For example, the display file record 300*a* may indicate that 'DisReq1 Bob'siPhone' was uploaded '05/14/2013' at '14:00:05'; for 'Banker's Life Fieldhouse' and is to be played during 'Margaritaville'. Metadata may be used to determine profile information, may be used to remove obsolete or invalid files, etc.

As illustrated in FIG. 4 a detection file record table 402 which may comprise a number of detection file records is provided. One or more detection file records may be associated with or resident in the servers 105, 110 (FIG. 1). The detection file record table 402 may include information of detection files which may have been uploaded to the server 105 by a device such as the imaging device 125. The detection file records 400*a-c* may include a detection file ID field 405, a detection file name field 410, a detection file source device 10415, a detection file acquisition information field 420, a detection file content field 425, a detection file user information field 430, a detection profile information field 435, and a detection file mosaic ID field 440.

The detection file ID field 405 may include information of a detection file 10. A detection file ID is preferably unique and used consistently. A detection file ID serves to distinguish a detection file record associated with a detection file from detection file records associated with other detection files. A detection file ID may provide information to a user about a specific file. As illustrated in FIG. 4 'BankersLifeBuffettCamera1' is associated with detection file record 400a. This may indicate a Camera 1 at Banker's Life may have been used during the Jimmy Buffett Concert to obtain information of a mosaic of tessera devices which may be indicated in the detection file record 400a.

The detection file name field 410 may include information of a detection file name. A detection file name may be a name given to a file by user to identify a specific file. Content of a file may be identified by a detection file name. For example, 'LucasOilStadiumCamera5' in the detection file record 400b is identified by the detection file name 'Lucas Oil Sprint Gate'. This may indicate that a user has assigned the name 'Lucas Oil Sprint Gate' to the detection file in order to identify an area which is imaged in the detection file.

The detection file source device ID field 415 may include information of a number of source devices. A source device may be given a unique name provided by a user. A desktop, cellular phone, tablet, camera, etc., may require a user to register a device and provide a unique name to associate with the device. A source device ID may be provided a device, which may include model number, serial number, etc. For example, 'HDCam16' and 'HDCam1 0' are associated with detection file record 400c, which may indicate that those cameras have obtained images which may be used to detect a mosaic of devices. A number of devices may acquire multiple views of a tessera device.

The detection file acquisition information field 420 may include acquisition information. Acquisition information may include information relating to resolution, aspect ratio, frame rate, and/or pixel types of an acquired image. Acquisition information allows an image to be processed by adjusting resolution, aspect ratio, etc. to be viewed as a composite with images from other devices, and to allow appropriate scaling, skew compensation, depth processing from 2D to 3D, etc. Image acquisition information may be used to determine timing, geometry, scale factors, and other parameters which may be useful in the detection of locations and addresses of tessera devices. For example, 'HDCam5' may create images with '1920:1080' resolution at '70' frames per second with a '4:3' aspect ratio as indicated by the detection file record 400b The detection file content field 425 may include information of a file's contents. A file may contain a sequence of images and/or audio which has been stored. The detection file content field 425 may include a pointer to a location where a media file such as a Flash, JPEG, WMV, QuickTime, avi, mp4, h2612, etc. file may be located. A file may contain a series of images or a single image. For example, 'LucasOilStadiumCamer5' is associated with the content «'https://coltsgames/lucasoilstadium.com'». A server may decode a file based on a codec associated with the file.

The detection file user information field 430 may include information about a user who provides a detection file. A user may provide a username which is preferably unique and preferably used consistently. For example, a user may register an app, may login using a browser functionality of an imaging device, etc. A user may provide information associated with a username. Information provided by a user may include any number of alpha-numeric characters. For example, the detection file user 'IUBasketbaliCoach' is associated with detection file record 400c. This may indicate a display mosaic derived from the detection file 'AssemblyHaliCameras" submitted by 'IUBasketbaliCoach' may be accessed based on permissions associated with 'IUBasketbaliCoach'.

The detection file profile information field 435 may include information concerning a profile. Profile information may include a date and/or time at which a file is recorded, a location, an event, an event type, a recording type, and/or other information which may assist in detecting a device. A detection file profile may be used to associate profile information with a person associated with a tessera device. For example, if a tessera device is detected at an event, information indicated in the detection file profile information field 435 may be associated with a tessera device. For example, 'HOCam1' picked up a file on '05/10/2013' at '15:01:25'. By 'BankerslifeBuffetCamera1' may include video created by 'HOCam1' which may be a 'professional video' provided for a 'Jimmy Buffett Concert' as indicated by the detection file record 400a.

The detection file mosaic ID field 440 may include information of a mosaic 10. A mosaic ID may provide information about a mosaic of tessera devices on which information may be presented. A mosaic may be made up of tesserae combined to produce a mosaic. A mosaic ID may provide information which may be presented to a person for creation of a display request. As illustrated in FIG. 4, 'File2A' is associated with the detection file record 400c. This may indicate that the mosaic 'File2A' has been generated based on information provided by the detection file record 400c.

As illustrated in FIG. 5 a mosaic file record table 502 which may comprise a number of mosaic file records 500 is provided. One or more mosaic file records may be associated with or stored in the servers 105, 110 (FIG. 1). The mosaic file record table 502 may include information of mosaics of tessera devices. The mosaic file record 500 may include a mosaic file ID field 505, a mosaic file detection ID field 510, a mosaic file description field 515, a mosaic file tessera ID field 520, a mosaic file spatial data field 525, and a mosaic file profile field 530.

The mosaic file ID field 505 may include information of a mosaic file 10. A mosaic file ID is preferably unique and used consistently. A mosaic file ID serves to distinguish a mosaic file record associated with a mosaic file from mosaic file records associated with other mosaics. For example, 'File300' is used to describe the mosaic file record associated with 500a.

The mosaic file detection ID field 510 may include information of a mosaic file detection file which has been used to detect a mosaic. The mosaic file detection ID provides information a source which may have been used to create the spatial, temporal, and address mapping associated with a mosaic. A mosaic file may be created from any number of detection files. A mosaic file detection ID may consist of any number of letters and or numbers. For example, 'LucasOilStadiumCamera5' is the mosaic file detection ID associated with mosaic file record 500b, while 'BankersLifeBuffettCamera1' is the mosaic file detection ID associated with mosaic file record 500a. As illustrated in FIG. 5, multiple detection file IDs may be used to create a mosaic file. These detection IDs may provide images at different time points, from different angles, of overlapping groups of tessera, etc. and may be analyzed collectively to create a mosaic file or map. For example, the detection files 'AssemblyHaliSection16' and 'AssemblyHaliSection10' maybe used to create the mosaic record 'File2A' as indicated by the mosaic file record 500c.

The mosaic file description field 515 may include information of a name associated with a mosaic. A mosaic file may contain any information a user is interested in displaying. For example, 'File2A' is described as 'Assembly Hall IU home basketball'. A mosaic file description may be used to index files of interest.

The mosaic file tessera ID field 520 may include information of a mosaic file tessera 10. A mosaic file may include multiple tesserae which may each be used to make up an image. Multiple devices may be present at an event and/or a location and may be utilized to take a picture and/or display an image. For example, 'Tom'sAndroid', 'JillsG4', 'Chris'sTablet', and many other cellular phones, tablets, etc., may be used to display 'FileAB'.

The mosaic file spatial data field 525 may include information of mosaic file spatial data. Mosaic file spatial data may include a unique spatial location assigned to a tessera device indicated in the mosaic file tessera ID field 520. For example, 3 dimensional coordinates based on a datum might be assigned to a device indicated in the mosaic file tessera ID field 520. A spatial extent may be assigned to a tessera device based on device information and/or image data used to create a mosaic file.

The mosaic file profile field 530 may include information of users associated with a mosaic file. A mosaic file profile may include user information such as information of users associated with tessera devices (age, gender, etc.) types of devices, participation, prior events, etc. For example, 'File2A' associated with mosaic file record 500*c* may include users who attend 'concerts'; 'sporting events'; 'Ohio State v. IU'. Such data may be used to characterize users and to select information provided to the users based on history of user activities such as prior concerts, sporting events, etc.

Figure 6:
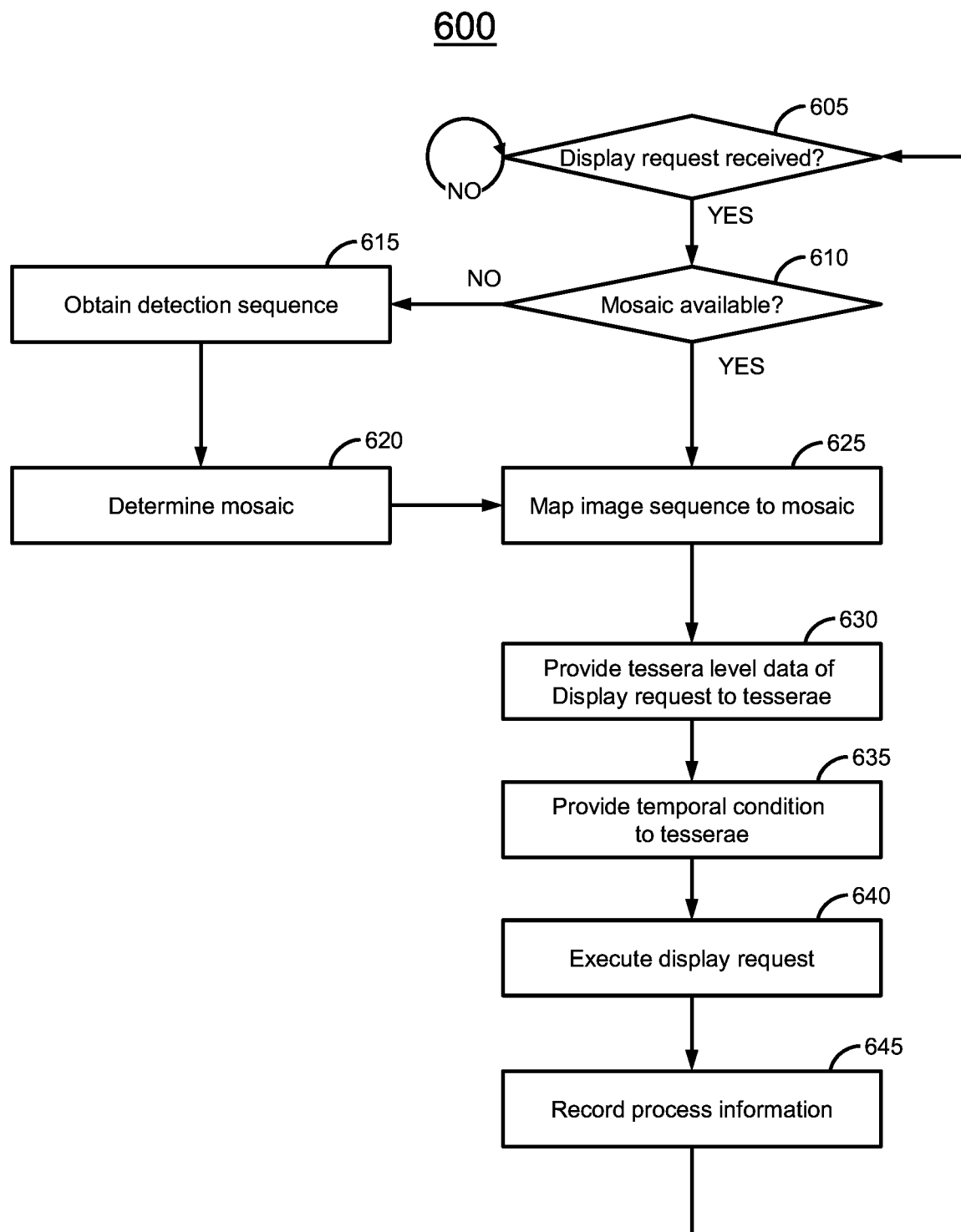
FIG. 6 is a flowchart of displaying an image sequence.

As illustrated in FIG. 6 a process 600 for presenting a display or image is provided. The process 600 may be performed in whole or in part by any suitable element of the system 100 (FIG. 1). In at least one embodiment, the process 600 is operative on the server 105. A display request may originate from any device. In an embodiment, the image system 125 may request that a display is provided.

In operation 605 (FIG. 6) a determination is made as to whether a display request is received. If it is determined in operation 605 that a display request is not received, control remains at operation 605 and process 600 continues. If it is determined in operation 605 that a display request is received, control is passed to operation 610 and process 600 continues.

The determination in operation 605 may be made using various criteria. In at least one embodiment, if a display request is received at a server associated with the server 110 (FIG. 1), it may be determined that a display request is received. For example, if an image is received at an address associated with server 105 it may be determined that a display request is received. An authorization and/or verification process including security data may be required as part of a determination that a display request is received.

In operation 610 a determination is made as to whether a mosaic is available. If it is determined in operation 610 that a mosaic is not available control is passed to operation 615 and process 600 continues. If it is determined in operation 610 that a mosaic is available control is passed to operation 625 and process 600 continues.

The determination in operation 610 may be made using various criteria. For example, a mosaic may be determined to be available if a mosaic record or other suitable description of a mosaic indicated by a display request is stored on a server such as the server 105 (FIG. 1). A mosaic may also be available if a mosaic description such as the mosaic record 500*a* (FIG. 5) is provided from a user device such as the tessera device 135 and/or the imaging device 120. For example, an identifier of a mosaic stored in a database of the server 105 may be included in a display request.

In operation 615 a detection sequence is obtained. A detection sequence is obtained which may provide information of a mosaic requested by a display request. For example, a message may be sent to an imaging device requesting an imaging device to obtain information of a detection sequence such as that indicated in the detection file record 400*a* (FIG. 4). A number of imaging devices associated with a location may be requested to provide a detection sequence. For example, a number of cell phones might be requested to acquire and/or provide video clips based on a request. Control is passed to operation 620 and process 600 continues.

In operation 620 a mosaic is determined. A mosaic may be made of tesserae from a single device and/or multiple devices. Tesserae identified, spatial or location and address data of a mosaic is determined. A tessera may have specific dimensions, timing, coordinates, brightness, etc. which may need to be merged with other tesserae. In some instances detection sequences may include images of a tessera from an imaging device which may overlap images from another image device and any overlap may need to be removed. A method for detecting a mosaic is further described herein with respect to FIG. 7. Control is passed to operation 625 and process 600 continues.

In operation 625 an image sequence is mapped to a mosaic. A mosaic may contain any number of devices or tesserae. Content of a display request may be scaled, and/or distorted. A user may interact with a pattern which represents a display sequence mapped to a mosaic as part of a mapping process. A process for mapping a display request to a mosaic is further described herein with respect to FIG. 8. Control is passed to operation 630 and process 600 continues.

In operation 630 tessera level data of a display request is provided to tesserae. An image may be mapped to a mosaic made of one or many tesserae. An image may be reduced to a sequence of images which are associated with production of a display request by a mosaic. Individual tessera may produce a series of images which are a pixel of a displayed mosaic image. Tessera level data may be provided as continuously streamed data. Tessera level data may be provided as a file stored on a tessera device. For example, if tesserae are used as pixels, a sequence of color and/or luminance information may be provided to a video player of an app on a tessera device. If tesserae are being used as fragments of a larger display, a sequence of images including a subset of a larger image may be provided. Control is passed to operation 635 and process 600 continues.

In operation 635 temporal conditions are provided to tesserae. A temporal condition may include a start condition which may be any number of conditions which a tessera uses to recognize a start. A start condition may be a time, the start of a song (i.e., a detected audio signal), the start of an event, etc. Tesserae may be started and the timing synchronized in order to properly display a request. A start condition may be based on any type of input device available to a tessera device. A camera of a cell phone might be used to detect an optical event which starts a display of an image by a tessera device. A microphone input of a tessera device might be used to initiate a display by a tessera device. A user input such as activation of a switch or touching a screen might initiate a display by a tessera device. Temporal information such as an internal clock of a tessera device might be used to initiate a display by a tessera device. A notification from a server, an instant message, SMS message, etc. might be used alone and/or in combination with other events to initiate a display by a tessera device. A stop condition may be provided as a temporal condition. Control is passed to operation 640 and process 600 continues.

In operation 640 a display request is executed. A display request may be executed in various ways. A display request may be executed responsive to a trigger event. A tessera device may execute a display request based on stored information, information streamed to the tessera device and/or a combination thereof. A process for execution of a display request is further described herein with respect to FIG. 9. Control is passed to operation 645 and process 600 continues.

In operation 645 process information is recorded. Information of an RGB intensity, location mapping, timing, address, mosaic, tessera, etc., may be recorded. A stored display request and/or mosaic may be stored for a later user or may be used to provide information on location, timing, users, imaging devices, etc. Control is passed to operation 605 and process 600 continues.

Figure 7:
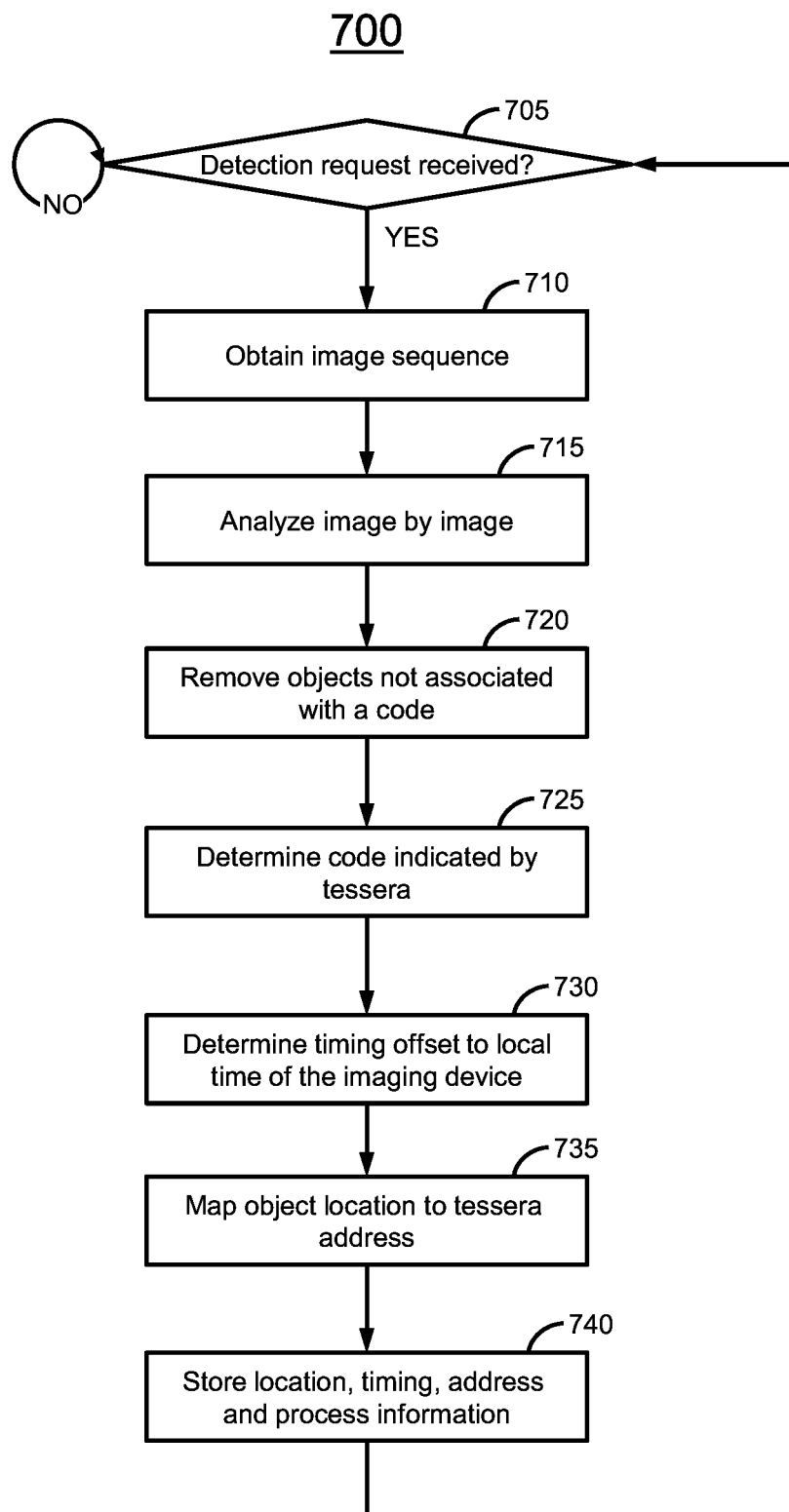
FIG. 7 is a flowchart of detecting elements of a mosaic.

As illustrated in FIG. 7 a process 700 for detecting a mosaic is provided. The process 700 may be performed in whole or in part by any suitable element of the system 100 (FIG. 1). In at least one embodiment, the process 700 is operative on the server 110. A detection request may for example originate from a device which produces a sequence of images such as the imaging device 120 (FIG. 1).

In operation 705 (FIG. 7) a determination is made as to whether a detection request is received. If it is determined in operation 705 that a detection request is not received, control remains at operation 705 and process 700 continues. If it is determined in operation 705 that a detection request is received, control is passed to operation 710 and process 700 continues.

The determination in operation 705 may be made using various criteria. In at least one embodiment, if a detection request is received at a server associated with the server 110 (FIG. 1), it may be determined that a detection request is received. For example, if a request is received at an address associated with server 105 it may be determined that a detection request is received. A detection request may be internal to a device such as the imaging device 120 (FIG. 1). For example, an image capture app operative on a smartphone might capture a video sequence which is selected by a user of the smartphone and is analyzed according to the process 700.

In operation 710 an image sequence is obtained. An image sequence may be obtained from any device capable of producing an image. For example, cellular phones, tablets, watches, wireless digital cameras, professional video cameras, etc. may be used to produce image sequences. A device and/or devices may produce multiple image sequences to depict a location which includes a mosaic. Image sequences may be acquired synchronously and/or asynchronously. A field of view or area included in an image may overlap a field of view or area included in other image sequences. A sequence may include any number of images. Control is passed to operation 715 and operation 700 continues.

In operation 715 an image sequence is analyzed image by image. Sequential or image by image analysis may be used to determine the timing and location of a tessera device. Tessera devices may be synchronized. For example, local time may be provided to tessera devices by a cellphone tower, a GPS satellite, a server, etc. Frame by frame analysis may allow for better timing of reproduction of a display request by a mosaic. For example, a time offset may be adjusted so multiple tessera devices share start times and are playing a local data file within a timing error of not more than one or two frames. This is achieved by analyzing a recording frame by frame to adjust for slight variations in the synchronization of devices, as is further discussed herein with respect to FIG. 16. A sequence of images may be decoded to individual frames based on an encoding standard used to produce a video clip. Control is passed to operation 720 and process 700 continues.

In operation 720 objects not associated with a code are removed. A tessera device is associated with a unique identifier or code. A unique identifier associated with a tessera device is used to create a sequence of images which is representative of the unique identifier or code. Objects not associated with a code are removed from consideration as tesserae to prevent an incorrect reproduction of a display request using a mosaic. Objects such as lighting fixtures, static cell phones, etc., which produce unwanted light are not associated with a code, and thus can be more easily removed as they have little or no temporal variation in brightness as further illustrated with respect to FIGS. 17 and 18. Known fixed lighting fixtures may be used to provide scaling of images as well as depth corrections. Control is passed to operation 725 and process 700 continues.

In operation 725 a code indicated by a tessera is determined. As each image in a sequence will likely include many tesserae, it is necessary to know which address or unique identifier is associated with a particular object which is found in the image. As each tessera device produces a unique temporal sequence of illumination, analysis of brightness and/or chromaticity associated with a located bright object in successive image frames allows a unique identifier of a tessera to be associated with a location of a bright object. Control is passed to operation 730 and process 700 continues.

In operation 730 timing offset to local time of the imaging device is determined. Timing offset to local time of the imaging device is determined to further synchronize tessera devices. Tessera devices have signals that may originate with a local wireless tower, a wireless router, a server, a broadcast, etc. and provide time information to a tessera device. A time provided is relatively the same for all devices, but may be off by a few seconds due to factors such as transmission delays, differing cell service providers, different local time sources, etc. A timing offset corrects for the minor differences in time allowing all tessera devices to reproduce a display nearly simultaneously. A timing offset can be determined in various ways. A timing offset can be detected based on a code sequence produced by a tessera device which is captured in an image sequence which is used to determine tessera codes associated with spatial coordinates. Time offset compensation is further described herein with respect to FIG. 16. Control is passed to operation 735 and process 700 continues.

In operation 735 an object location is mapped to a tessera address. A detected bright object is associated with an address which is determined by analysis of an image sequence. If a bright object is not found to correlate to a tessera device address or code or unique identifier, the bright object may be identified as a background object. If a bright object is found to match a tessera address, coordinates of the bright object may be assigned to the tessera device identifier or address, which may later be used to send a file or information to a tessera device for reproduction of a display request. A relative location of a bright object which is based on a pixel map may be compared to known geometric information of a location. For example, in a concert hall, a comparison of a number of pixels between tessera devices may be compared to a seat map, etc. which may be used to give absolute scale to a mosaic. Likewise, a map of background light sources which are in pre-determined locations may be used. Alternately, previously mounted tessera devices may be placed in known locations to provide scale and geometric references. As image sequences may overlap in viewing area, the unique address of a tessera device may be used to identify and resolve overlaps in order that a mosaic may be extended to tesserae in multiple image sequences of a detection request. Control is passed to operation 740 and process 700 continues.

In operation 740 location, timing, address and process information are stored. Location, timing, address and process information may be stored in a server such as the server 105. The location, timing, address and process information may be used to understand interests and dislikes of a user, to provide information on a location to future users, to create synchronized displays, etc. Control is passed to operation 705 and process 700 continues. The process 700 may be used to detect any number of tesserae. A mosaic such as that represented in the mosaic field records 500*a*-500*c* may be accessible to a restricted group or may be available for public use to reproduce a display request based on permission applied to a detection request and/or a mosaic.

Figure 8:
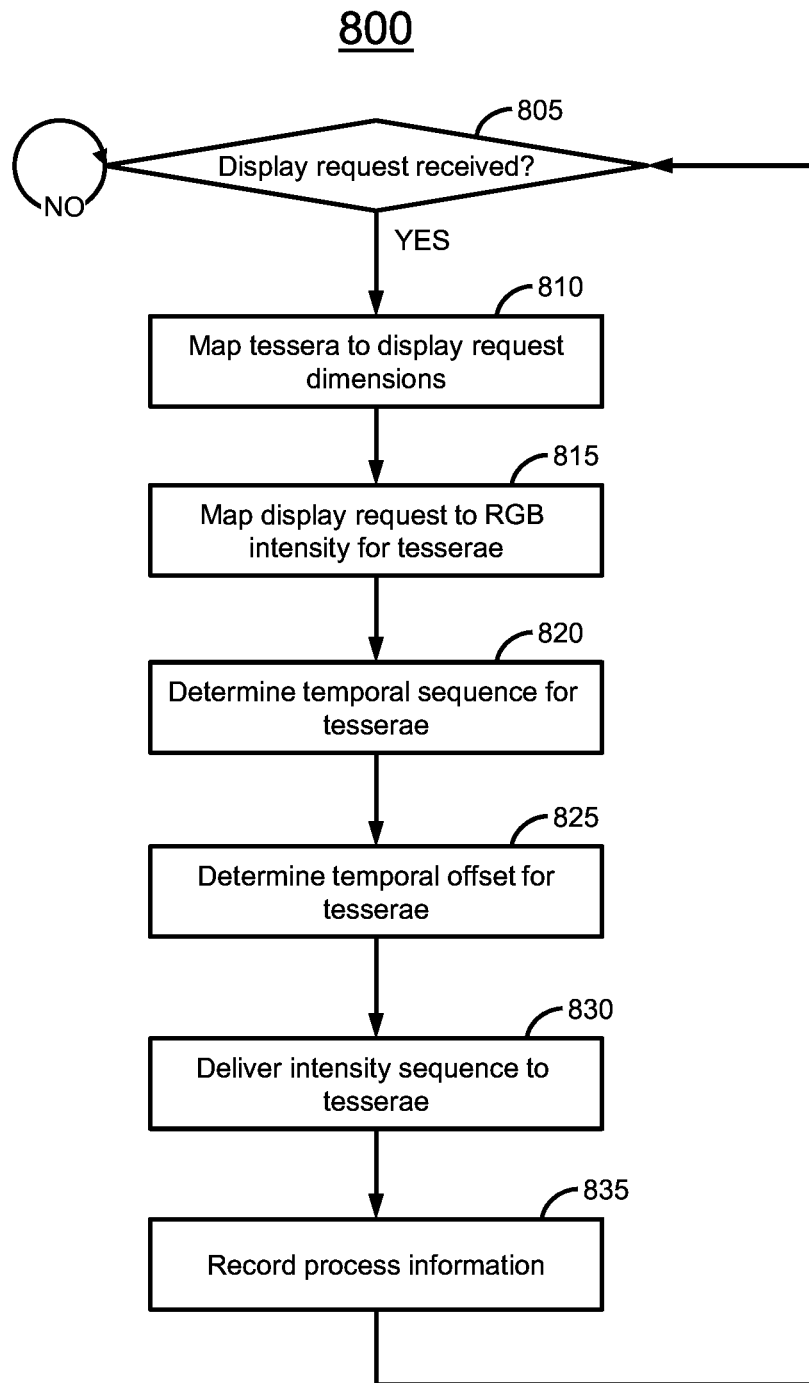
FIG. 8 is a flowchart of distributing display information to tesserae devices.

As illustrated in FIG. 8, a process 800 for displaying a request is provided. The process 800 may be performed in whole or in part by any suitable element of the system 100 (FIG. 1). In at least one embodiment, the process 800 is operative on the server 110. The process 800 may be utilized by any suitable device to create a desired display sequence which may be reproduced by any accessible mosaic.

In operation 805 (FIG. 8) a determination is made as to whether a display request is received. If it is determined in operation 805 that a display request is not received, control remains at operation 805 and process 800 continues. If it is determined in operation 805 that a display request is received, control is passed to operation 810 and process 800 continues.

The determination in operation 805 may be made using various criteria. In at least one embodiment, if a display request is received at a server associated with the server 110 (FIG. 1), it may be determined that a display request is received. For example, if a display request is received at an address associated with the server 110, it may be determined that a display request is received. A person operating a GUI such as that illustrated in FIG. 21 may take an action which may determine that a display request is received.

In operation 810 a tessera is mapped to display request dimensions. A device is mapped to display request dimensions to create a clear and accurate display. Tessera may range in size, pixel area, shape, brightness, etc. and may be mapped to accurately provide a desired display or sequence of light output. For example two cameras may have provided overlapping images and these will be mapped to reduce the overlap and provide a complete image to a user which may be used to determine a relationship between a tessera and a display request. Mapping may be performed using automated scaling and/or may be assisted by a person creating a display request as further described herein. Any number of tessera devices may be mapped to a desired display area. Control is passed to operation 815 and process 800 continues.

In operation 815 a display request is mapped to RGB intensity for tesserae. As each tessera is an independent device, it is necessary that a display request can be separated or decimated into a format which can be displayed by the individual devices. In an instance in which each tessera is a single pixel or pixel group, a sequence of images may be displayed by a tessera device which may represent the relative intensity of the pixel for the image or sequence of images which comprise an image or display request. Similarly in an instance in which a mosaic is composed of image fragments which are part of a larger composite image a subset of a larger image assigned to a tessera device may be distributed to a respective tessera. Control is passed to operation 820 and process 800 continues.

In operation 820 a temporal sequence is defined for tesserae. Because a display request may be composed of multiple images, each tessera may be required to display a temporal sequence of information. For example, if a display request requires an image which moves, a tessera which might display a particular intensity to produce a requested image initially might be required to display a different intensity in a subsequent time interval. Temporal sequences for tesserae may be composed of a continuous stream of frame by frame images such as a video clip and/or may be a 'slide show' sequence of images which may be presented for one or more frames, etc. A temporal sequence for a tessera may be provided in various formats which are suitable for the tessera device. A mosaic may be composed of various types of tessera devices, which may require formatting of a temporal sequence to suit a tessera device. For example, if a tessera device is a smart phone, a video clip format may be suitable, while if a tessera device or sub-element thereof has memory and/or processing power limitations, a more compressed file format may be desirable. Control is passed to operation 825 and process 800 continues.

In operation 825 temporal offset for tesserae is determined. Temporal offset may be adjusted to play an image or an app synchronously on all devices of a mosaic. A sequence may be streamed to adjust a video to music speed, timing, etc. This may allow devices which may start slightly sooner or later when displaying a unique pattern assigned to the device to adjust and be played at the same time as another tessera device of a mosaic. Control is passed to operation 830 and process 800 continues.

In operation 830 an intensity sequence is delivered to tesserae. An intensity sequence is based on a spatial device map and a corresponding address for a mosaic. An intensity sequence allows a device mosaic to display an image, video etc. to a person, group or crowd. An intensity sequence may be delivered as a file such as a video clip, slide show, or other form of media which is compatible with a tessera device. Any suitable element of the system 100 may be used to deliver an intensity sequence. An intensity sequence may be streamed and/or may be sent and stored for future playback. An intensity sequence may be adjusted based on a luminosity and/or temporal factor determined for a tessera device. Control is passed to operation 835 and process 800 continues.

In operation 835 process information is recorded. Information of an intensity sequence, location mapping, timing, address, etc., may be recorded. A stored display request may be used for subsequent display requests, may be used to provide information on location, timing, etc. Control is passed to operation 805 and process 800 continues.

Figure 9:
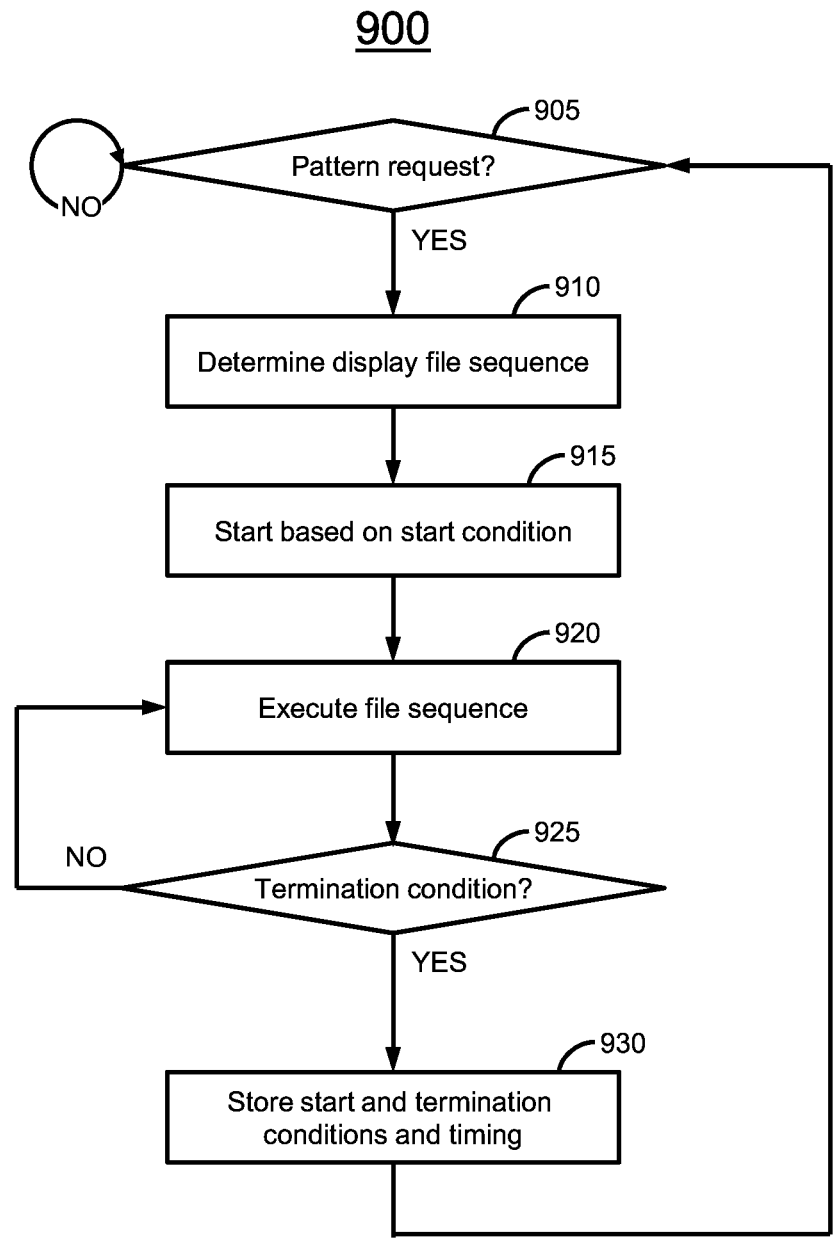
FIG. 9 is a flowchart of displaying a sequence by a tessera device.

As illustrated in FIG. 9, a process 900 of displaying of a pattern by a tessera device is provided. The process 900 may be performed in whole or in part by any suitable element of the system 100 (FIG. 1). In at least one embodiment, the process 900 is operative on the tessera devices 135, 140. A pattern may be an intensity sequence such as that delivered to a tessera device using the process 800.

In operation 905 (FIG. 9) a determination is made as to whether a display request is received. If it is determined in operation 905 that a display request is not received, control remains at operation 905 and process 900 continues. If it is determined in operation 905 that a display request is received, control is passed to operation 910 and process 900 continues.

The determination in operation 905 may be made using various criteria. In at least one embodiment, if a display request is received at a tessera device 130 (FIG. 1), it may be determined that a display request is received. A display request may be received by any device which is a part of a mosaic. A display request may be a message such as an Internet Protocol (IP) message, an SMS or MMS message, an 1M, an audio message such as a song, a tone, a visible cue, a time marker or temporal data and/or any communication which may be delivered to a device which may indicate that a display is to be produced.

In operation 910 a display file sequence is determined. A display file sequence may be determined which depicts an image or images which are associated with a display pattern or image identified in a display request. A display file sequence may be a pattern of images provided to a tessera device to provide information at correct locations and times to synchronize a mosaic and reproduce a display pattern associated with a display request. Tessera devices may produce a temporal pattern which may for example allow a set of images to be displayed. For example an image or pattern may be displayed while a song is playing or during a sporting event. Control is passed to operation 915 and process 900 continues.

In operation 915 a device starts based on a start condition. A display file sequence may provide a start and end time for a device to reproduce a display sequence. A display start condition may be important to provide a synchronized viewing experience on tessera which may comprise a mosaic. For example if a mosaic is displaying an animated sequence of images, if each tessera is not changing at a suitable time, the animation may appear incorrectly, or an image may appear to be distorted. Likewise, if a tessera is a part of a mosaic in which a larger, dynamic image is presented on multiple displays, a lack of synchronization will produce noticeable errors when image content is changing rapidly. A start condition may include receipt of a notification, or message, temporal information such as time of day, visual information such as an image or flash of light, audio information such as a tone or sequence of tones, a user input such as a key press, screen touch, etc. A start condition may include any combination of such events. Control is passed to operation 920 and process 900 continues.

In operation 920 a file sequence is executed. A display file sequence may include any number of images and/or sounds. A display file sequence may be executed as a loop which can be terminated at any point in the display sequence. Control is passed to operation 925 and process 900 continues.

In operation 925 a determination is made as to whether a termination condition occurs. If it is determined in operation 925 that a termination condition occurs, control is passed to operation 930 and process 900 continues. If it is determined in operation 925 that a termination condition does not occur, control is passed to operation 920 and process 900 continues.

The determination in operation 925 may be made using various criteria. In at least one embodiment, if a termination condition is detected by a tessera device such as the tessera device 135 (FIG. 1), it may be determined that a termination condition has occurred. A termination condition may be any number of predetermined termination conditions set by a user, a server, or any other information available to a tessera device to terminate a display, which may include any type of condition which may be a start condition.

In operation 930 start and termination conditions and timing are stored. Start conditions, termination conditions and timing may be stored in any suitable device of the system 100 (FIG. 1). For example, a tessera device, a server, and/or an imaging device may record process information associated with the process 900. Information regarding a start condition, termination condition, etc. may be used to determine information of a user. For example, a start condition may include various alternate actions, which may reveal how a user has activated a display sequence. Similarly a stop or termination condition may reveal information of a user. Timing information may be compared to timing information associated with other tessera devices. Control is passed to operation 905 and process 900 continues.

Figure 10:
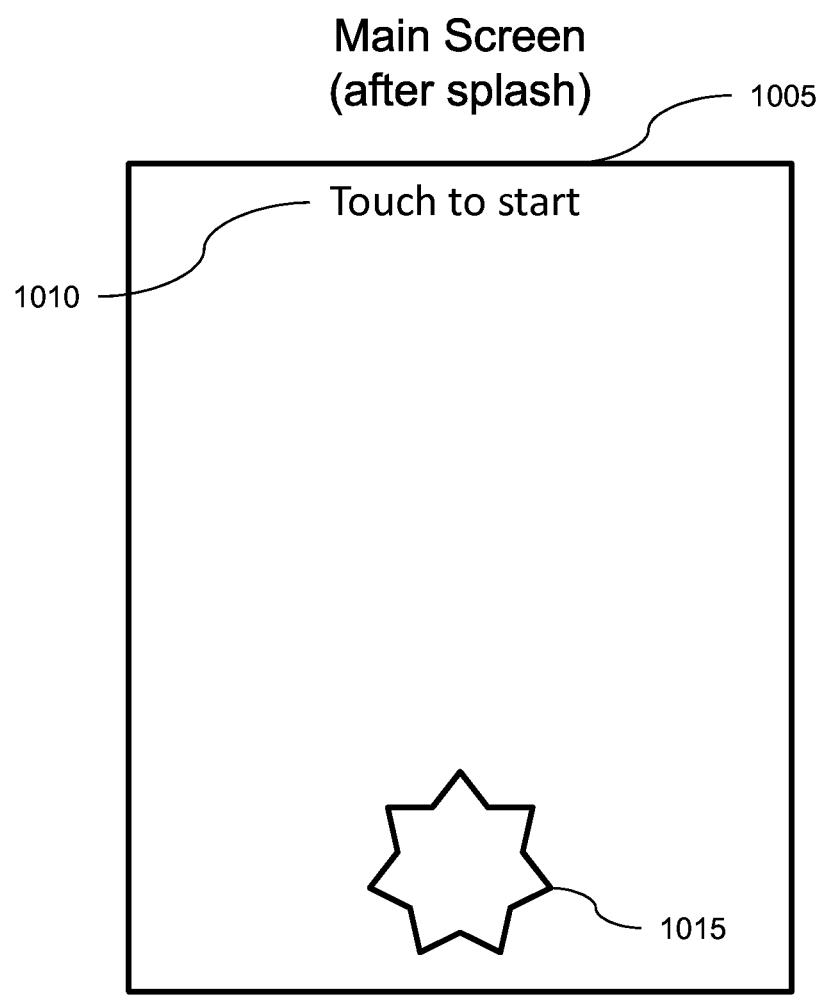
FIG. 10 is a Graphical User Interface (GUI) for a tessera device.

As illustrated in FIG. 10 an exemplary GUI 1000 is provided. The GUI 1000 may be presented using a system such as the tessera device 130 (FIG. 1). The GUI 1000 may be used to display a sequence file. The GUI 1000 may include an app main screen 1005, a touch to start control 1010 and a display control 1015.

An app main screen 1005 may activate a sequence file. A sequence file may include a file which may contain a sequence of images to be displayed during acquisition of an image sequence to be used by a detection request which may be referred to as a detection file. Images may be displayed based on activation of the touch to start control 1010. An image in a sequence file may be displayed for a specified time interval as determined by a sequence file based on a code or unique identifier assigned to a tessera device. A detection file may be unique to each download and based on an App ID which may be derived from a device ID associated with a tessera device. The App may receive any number of sequence files containing a sequence of images. If a user is not using an App when a sequence file is sent a user may receive a notification which may indicate that a sequence file has been received. A user may present a tessera device to an imaging device to allow an imaging device to take a photo and/or video of a tessera device for the purpose of creating a detection request for a number of tessera devices. A user may activate the 'touch to start' control 1010 to begin a detection process. The display control 1015 may cause a GUI such as the GUI illustrated in FIG. 11 to be provided when activated.

Figure 11:
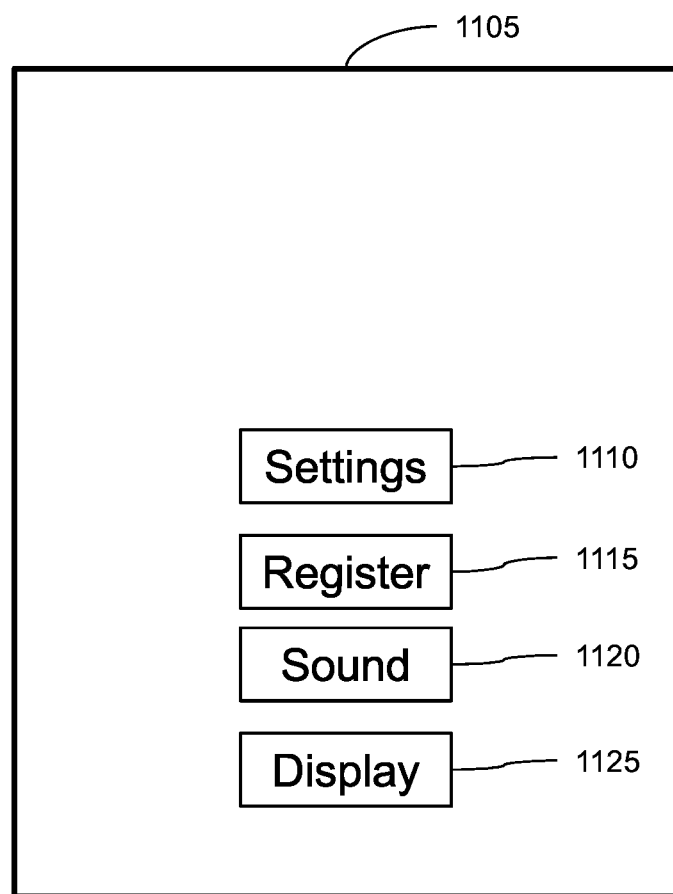
FIG. 11 is a GUI for managing settings of a tessera.

As illustrated in FIG. 11 an exemplary setup GUI 1100 is provided. The GUI 1100 may be presented using a system such as the tessera device 130 (FIG. 1). The GUI 1100 may be used to setup an app or other software operative on a device. The GUI 1100 may include an app setup screen 1105, a settings indicator 1110, a register indicator 1115, a sound indicator 1120, and a display indicator 1125.

The App setup screen 1105 may be used to adjust settings, sound, display and/or register an app. A settings indicator 1110 may be used to open an interface used to determine behavior of app notifications, etc. A register indicator 1115 may be used to open an interface to allow a user to register an app and review terms of service associated with an app and/or services associated with an app. A sound indicator 1120 may be used open an interface to view and modify audio settings. A display indicator 1125 allows the user to open an interface to adjust display parameters of an app. For example, a user may want to preserve the battery of their device and therefore may want to use a shorter display time-out.

Figure 12:
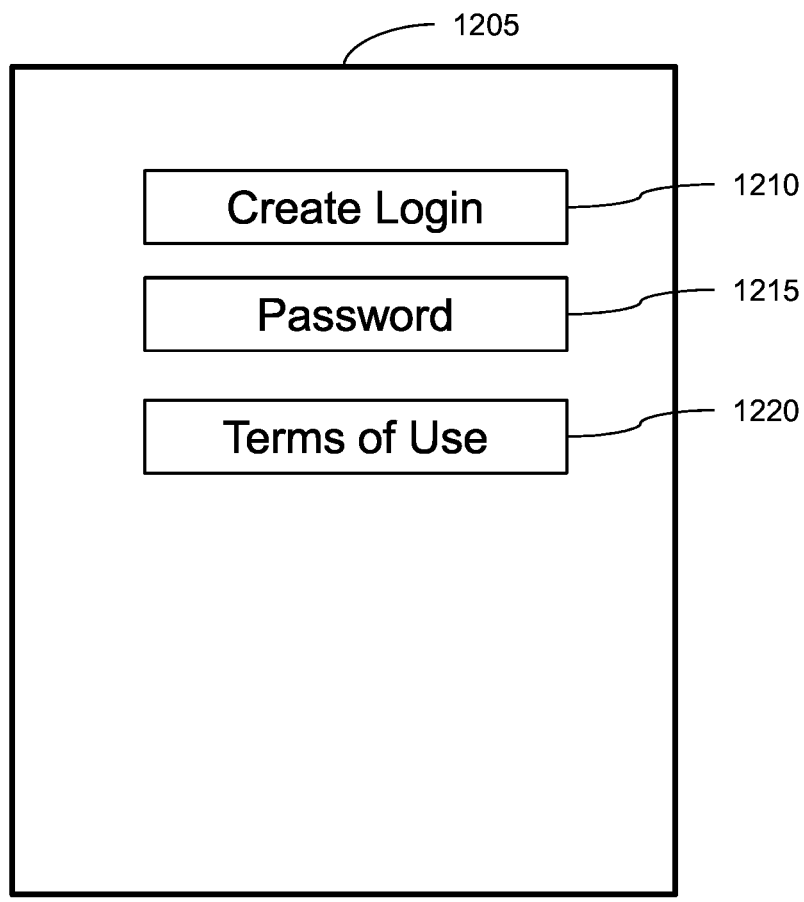
FIG. 12 is a GUI for registration of a tessera device.

As illustrated in FIG. 12 an exemplary registration GUI 1200 is provided. The GUI 1200 may be presented using a system such as the tessera device 130 (FIG. 1). The registration GUI 1200 may allow a user to register with a system providing a display request such as the server 110. The registration GUI 1200 may include a registration screen 1205, a login creation indicator 1210, a password indicator 1215, and a terms of use indicator 1220. Activation of the register indicator 1115 (FIG. 11) may cause the registration GUI 1200 to be provided.

When registering an app it is desirable that a user creates a unique login and password. A user may create a login using the create login indicator 1210. A user may be asked to provide a password which may allow only the specified user access to the app. A user may create a password using the password indicator 1215. An app may have terms of use which must be read and agreed to by all users of an app. A user may read the terms of use by activating the terms of use indicator 1220. Registration of a user may include creating a user profile which may include personally identifying information of a user. Registration may assist in providing advertisements and/or offers to a user. Profile information of users associated with a mosaic may for example be used in aggregated from to better understand composition of an audience at an event.

Figure 13:
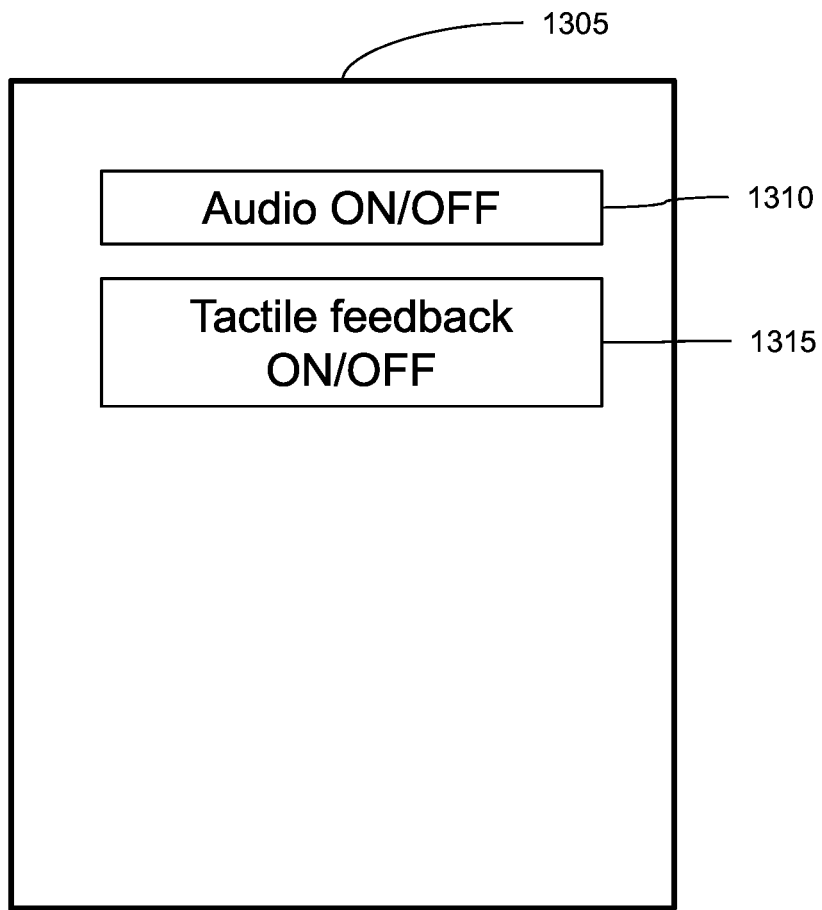
FIG. 13 is a GUI for managing audio functions of a tessera device.

As illustrated in FIG. 13 an exemplary audio GUI 1300 is provided. The audio GUI 1300 may be presented using a system such as the tessera device 130 (FIG. 1). The audio GUI 1300 may allow a user to adjust audio actions associated with an app. The audio GUI 1300 may include a sound screen 1305, an audio indicator 1310 and a tactile feedback indicator 1315. Activation of the sound indicator 1120 (FIG. 11) may cause the audio GUI 1300 to be provided.

The audio GUI 1300 may allow a user to adjust the sound provided by an app. A user may wish to view a display without sound and may do so by turning the audio off using the audio indicator 1310. Audio from an app may include audio determined by a sequence file as part of a display presentation. Audio may include an audible notification to a user when an event such as reception of a sequence file, a start or stop condition, a successful detection of a device, etc., has occurred. A user may wish to adjust the tactile feedback for a display by turning it on or off using the tactile feedback indicator 1315. Tactile feedback may inform a user of an event if audio has been muted.

Figure 14:
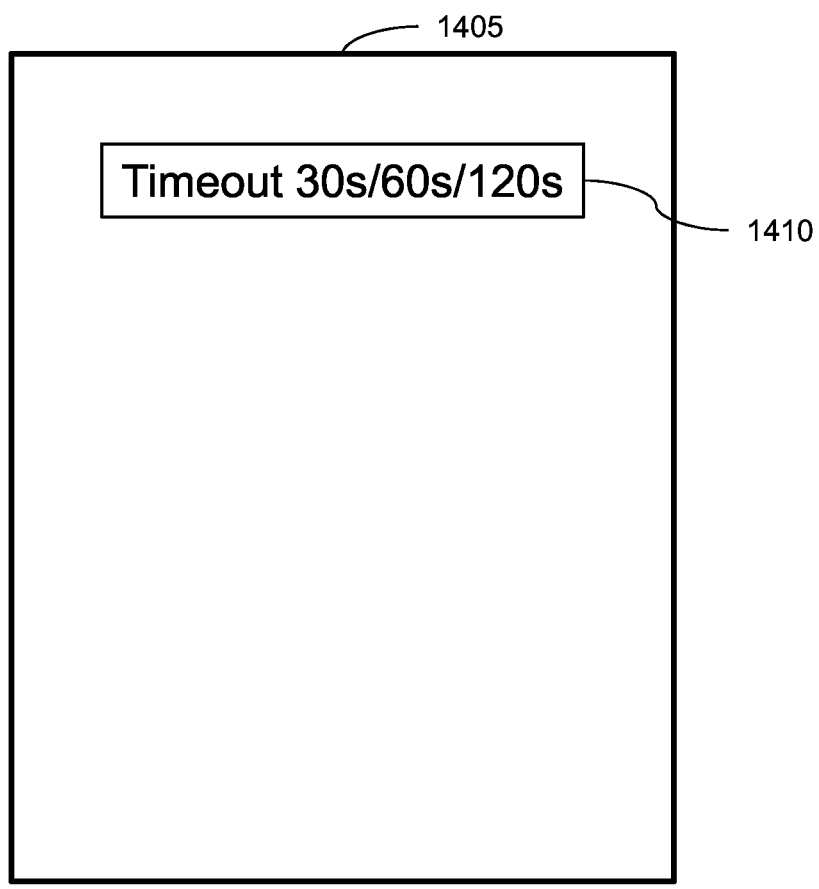
FIG. 14 is a GUI for managing display functions of a tessera device.

As illustrated in FIG. 14 an exemplary display GUI 1400 is provided. The display GUI 1400 may be presented using a system such as the tessera device 130 (FIG. 1). The display GUI 1400 may allow a user to adjust display parameters for an app. The GUI 1400 may include a display screen 1405 and a timeout indicator 1410. Activation of the display indicator 1125 (FIG. 11) may cause the display GUI 1400 to be provided.

A user may wish to timeout a display screen after a certain amount of time as decided by a user. A user may wish to choose a display timeout to prolong the battery life of a display device and/or may choose to not have the display timeout because it needs to be displayed continuously at an event. In any situation the display time may be chosen using the timeout indicator 1410. In the example, display timeouts of 30 s/60 s/120 s are used, but any time interval could be used.

Figure 15:
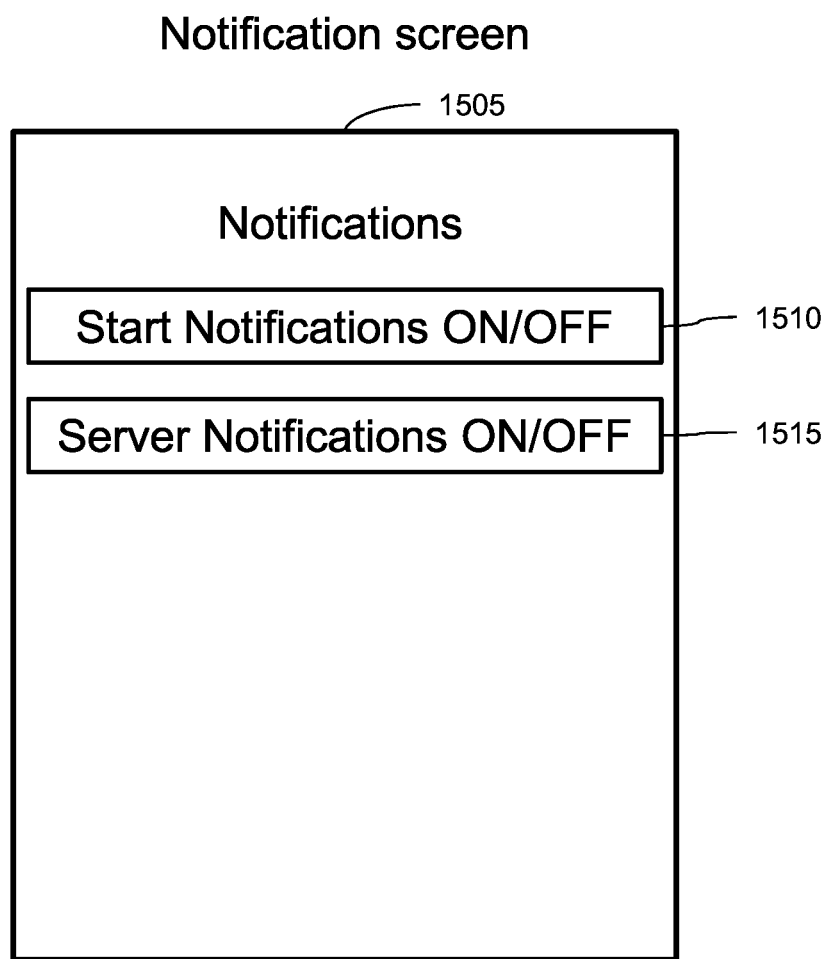
FIG. 15 is a GUI for managing notification functions of a tessera device.

As illustrated in FIG. 15 an exemplary notification GUI 1500 is provided. The notification GUI 1500 may be presented using a system such as the tessera device 130 (FIG. 1). The notification GUI 1500 may allow a user to adjust notifications provided to a user. The notification GUI 1500 may include a notification screen 1505, an app notification indicator 1510, and a server notification indicator 1515. Activation of the settings indicator 1110 (FIG. 11) may cause the notification GUI 1500 to be provided.

A user may wish to receive and/or block out of app notifications to be aware of updates to the app, a start or stop condition, a detection request, receipt of a new file, etc. A user may not wish to receive notifications and may only want information about an app when logged into an app. A user may determine whether or not to be alerted by a display start using the app notifications indicator 1510. App notifications may occur based on a local condition detected by an app while the app is operative on a user device such as the tessera device 130 (FIG. 1). A user may decide to receive server notifications indicating of conditions such as that an app may need an update, a new file has been received, a detection request has been received, a start and/or stop condition has been detected, a message has been received, etc. A user may turn server notifications on or off using the server notifications indicator 1515. While a limited number of user controls have been illustrated in the GUI's in FIGS. 10-15, no limitation is implied thereby. Any number of user controls and interfaces which may be needed to operate the embodiments may be provided. For example, a directory of downloaded files, various options for various types of alerts or notifications, controls relating to start and/or stop conditions, display parameters which may affect reproduction of a display request, more elaborate user profile data entry, and/or login via single sign on (SSO) such as those provided by Google, Facebook, Twitter, etc. may be provided.

Figure 16:
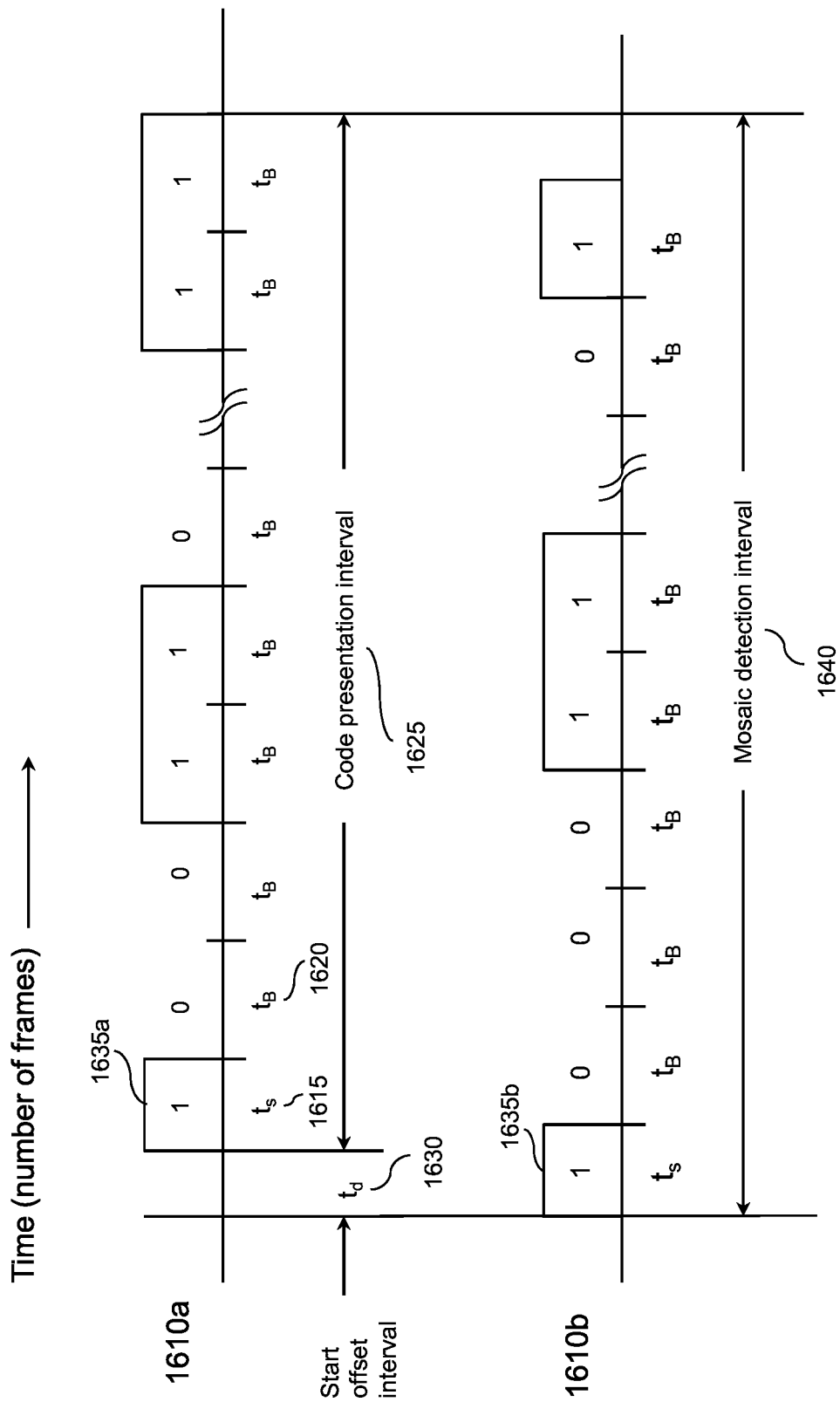
FIG. 16 is an exemplary timing diagram of acquisition of an address of a tessera device.

As illustrated in FIG. 16 an exemplary timing diagram 1605 of acquisition of an address of a tessera device is described. Based on a sequence of a number of images an address of a tessera device may be determined. Detection of a tessera device may be based on a sequence of illumination information. A tessera device may produce a sequence of images which may be interpreted as a numeric code. For example, the tessera device 130 (FIG. 1) might produce a detection sequence such as that illustrated in the timing diagram 1610a (FIG. 16). A detection sequence may consist of a start bit or image 1635a which is displayed for a start interval duration (ts) 1615 Bits or images representing an address or code assigned to the tessera device 130 may be displayed for a bit time duration (tB) 1620. A number of bits which may be determined to disambiguate various devices may be presented during a code presentation interval 1625. As tessera devices are typically operating from a precise internal clock, and images are presented in integer multiples of a frame time of a display device (e.g. when playing a video clip or streaming data), the start interval duration 1615 and the bit time duration 1620 will preferably be a multiple of a frame time of a display device or video player.

As previously discussed, a tessera device may be operating on a precise but unsynchronized clock or frequency reference. For example, GPS or GSM oscillators, CPU oscillators, etc. may provide precise timing information. It may be desirable that a number of tessera devices in a mosaic should begin synchronously in order that a dynamic display such as animation, etc., may be presented by a mosaic. In order to perform synchronization, a rough timing synchronization may be performed. For example, a cell phone or GPS enabled device might obtain local time information from a cell tower, a GPS satellite, a network access server, etc. A network enabled device might be informed of local time by a server. Audio tones or a light flash might be used to synchronize tessera devices. Such techniques may allow tessera devices in a mosaic to be synchronized within a few seconds or less.

A more precise synchronization may be obtained by determining a start offset interval (td) 1630. It is important to note that the start offset interval 1630 may be negative. In order to determine the start offset interval, the tessera device producing the information associated with the timing diagrams 1610a and 1610b are instructed to start producing a detection sequence at the same time according to the local clock of each device. By observing using a device such as the imaging device 120 (FIG. 1), to acquire a video sequence of the tessera devices, the number of frames between the appearance of the start bit 1635a and the start bit 1635b, the precise difference between the local time of tessera devices can be determined within one frame time of the imaging device. Any number of tessera devices may be synchronized based on a detection sequence acquired by a number of imaging devices.

A mosaic detection interval 1640 may be of importance for various reasons. If the mosaic detection interval is long, tessera devices may move, users may become bored, etc, during the mosaic detection interval 1640. Various factors may contribute to composition of a detection sequence. For example, use of color may allow an increase in a number of bits which can be presented in a frame, and thus reduce the number of bits required in the code presentation interval 1625. Multiple levels of brightness may be included in a detection sequence file, which may increase a number of bits per frame at the expense of signal to noise ratio in detection.

Figure 17:
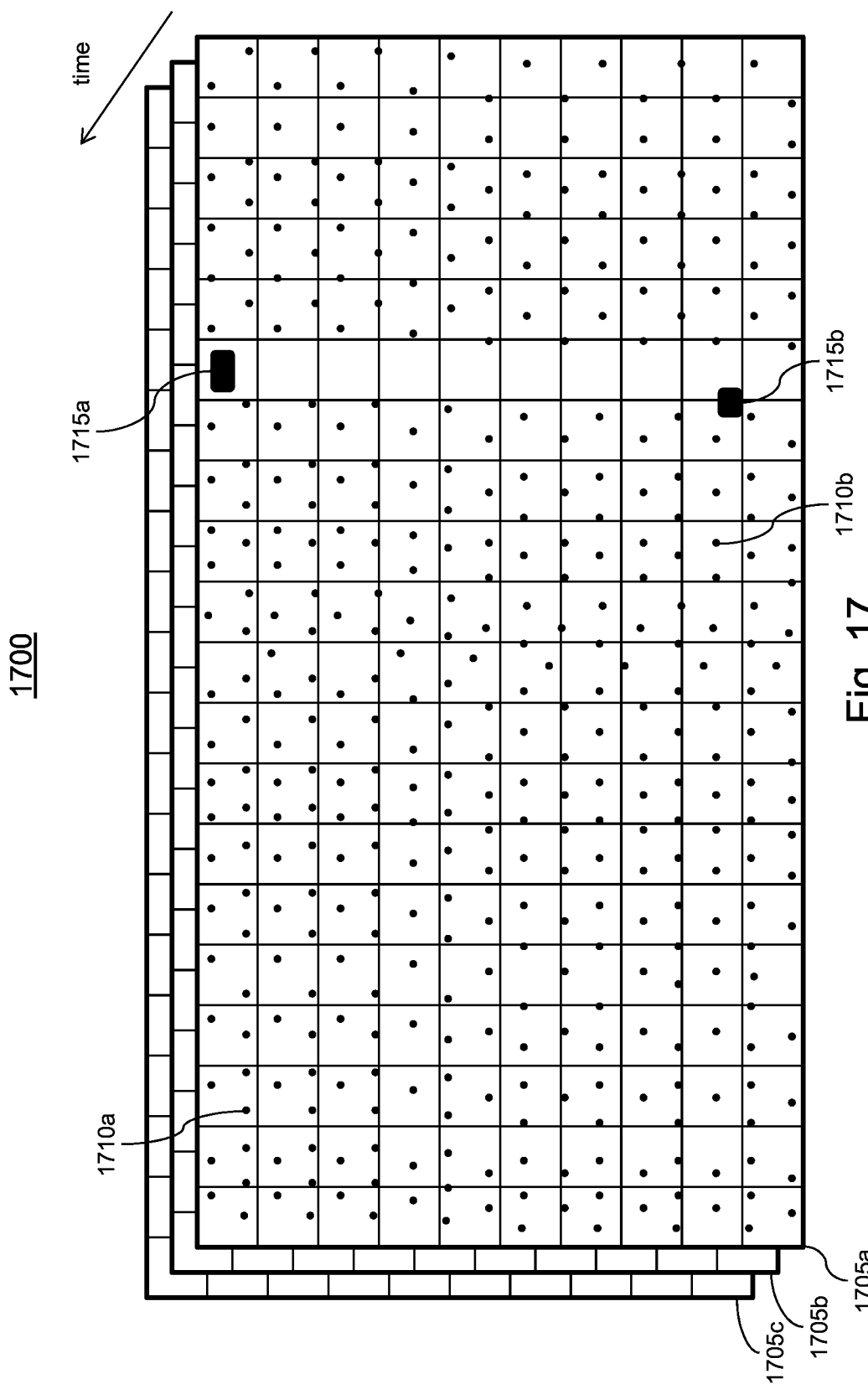
FIG. 17 is a diagram of an exemplary sequence of images for detecting a location of a tessera device.

As illustrated in FIG. 17 a diagram of an exemplary sequence of images 1700 obtained by an imaging device such as the imaging device 125 (FIG. 1) for detecting a location of a tessera device is provided. A mosaic may be made up of any number of tesserae each with a different and unknown spatial location. The images 1700 may be produced based on a detection file such as that represented in the detection file records 400a-400c (FIG. 4).

A first image of a group of tesserae is provided in 1705a with multiple other images provided in 1705b and 1705c. The images represent time-varying illumination and/or color information of tesserae devices. The pixel level data of the images 1705a-1705c represents a number of individual tessera devices as received by a pickup of a device such as the imaging device 120 (FIG. 1). A user may be asked to activate a tessera device using for example the GUI 1000 (FIG. 10) and to point the device towards an imaging device. A picture and/or video may be obtained of any visible tessera devices. The images 1705a-1705c may include video data of tessera devices 1710a, 1710b, and background or unwanted illumination sources 1715a, 1715b. The tessera device 1710a will appear as varying intensity, color, etc. based on a detection sequence unique to the tessera device 1710a. The unwanted lights 1715a, 1715b will be unvarying and/or will vary randomly, and thus may be easily removed from a mosaic and/or identified.

Figure 18:
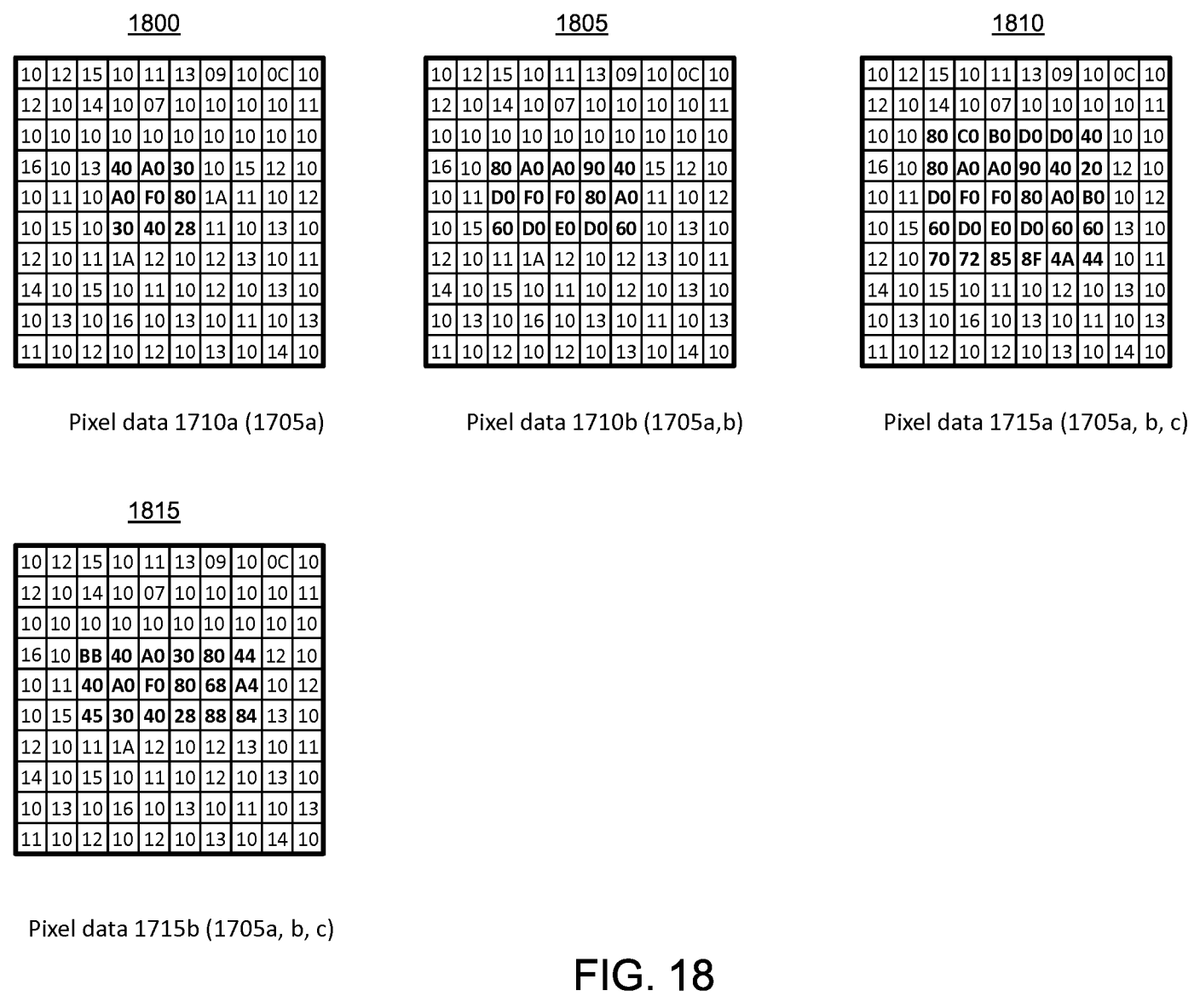

As illustrated in FIG. 18 exemplary pixel data diagram are described for a portion of the images 1705a-1705c in FIG. 17. As illustrated in FIG. 18, the small device pixel data 1800 which may be associated with the tessera 1510a may be illuminated in the image 1705a, but then become dark or background in the images 1705b and/or 1705c. Similarly the large device pixel data 1805, which may be associated with the tessera device 1510b may be illuminated in the image 1705a and 1705b, but then become dark or background in the image 1705c. Conversely, the very large background light object pixel data 1810 and the large background light pixel data 1815 illustrate that light originating from the unwanted lights 1715a, 1715b remains the same in the images 1705a-1705c.

Figure 19:
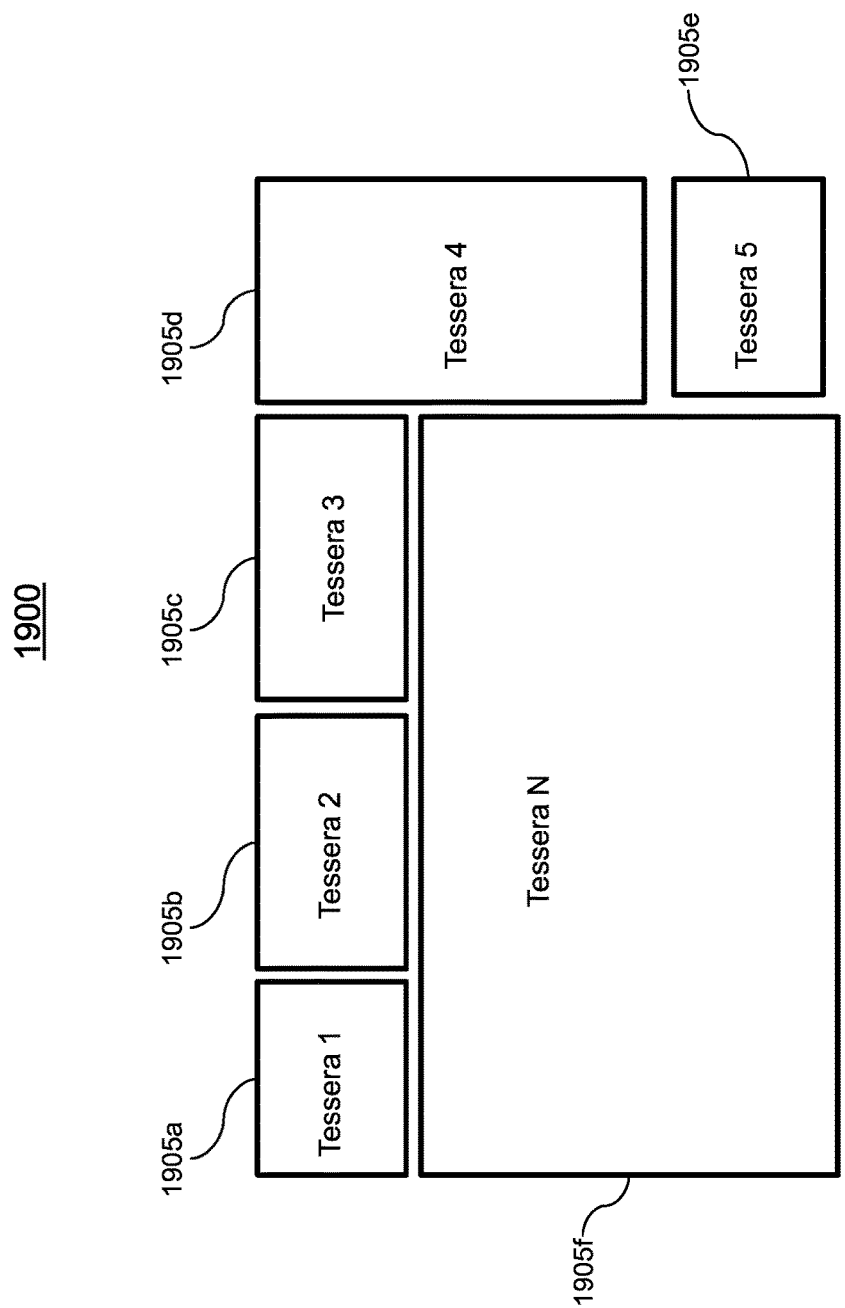
FIG. 19 is an illustration of an alternate form of mosaic display.

As illustrated in FIG. 19 an embodiment is provided wherein a group of tesserae provide of an alternate form of a mosaic display. A close proximity mosaic display 1900 may be created based on a number of tesserae or tessera devices which are to be viewed at a close distance at which spatial information displayed on tessera devices may be readily perceived. For example, multiple users may want to watch a sporting event such as a baseball game in a location where a big screen television is unavailable, playa game on multiple screens, create an ad-hoc display, an artistic presentation, etc. A user may take images of the tessera devices 1905a-1905f and the system will automatically detect how the devices fit together so each device may display a fragment of a total picture. In such an embodiment, a detection sequence may include illumination information and/or spatial patterns which are uniquely assigned to a tessera device to determine an address assigned to the tessera device. Synchronization can be performed as previously described herein. A detected mosaic may be targeted with a display request based on a detection request including images of the desired tessera devices 1905a-1905f. Using the exemplary tesserae in FIG. 19, to display a baseball game, Tessera 1 1905a may depict the left field, while Tessera 2 1905b the center field and Tessera 3 1905 the right field. Similarly, Tessera 4 1905d might be the right field foul line, Tessera 5 1905e might be home plate, and Tessera N 1905f is the largest device and may be a tablet and may display the infield of the baseball game. Each tessera is displaying only a portion of the total picture, but the collective tesserae are working in conjunction and synchronization to create an image on a larger scale.

Figure 20:
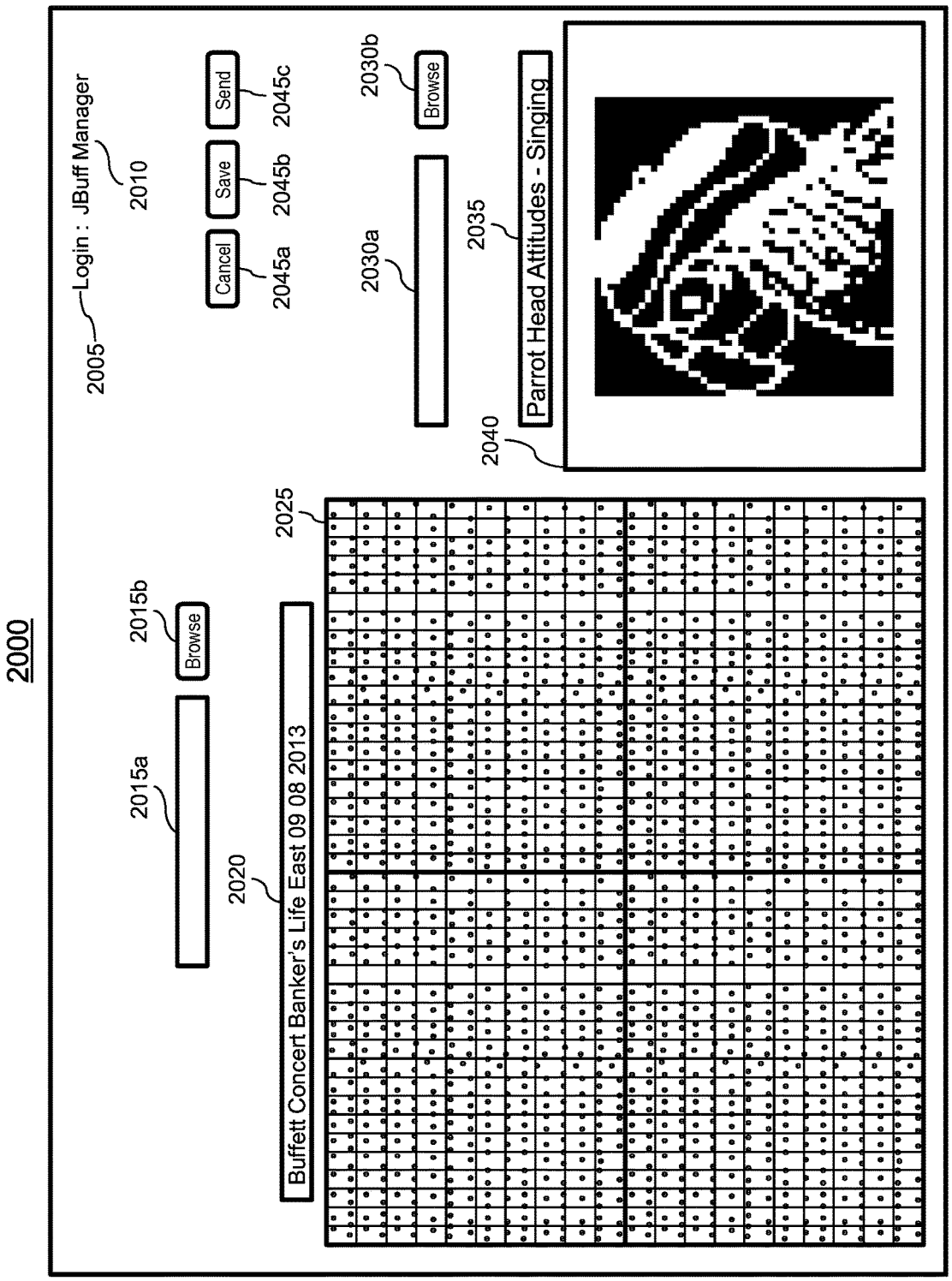
FIG. 20 is a GUI for creation of a display request.

As illustrated in FIG. 20 an exemplary request GUI 2000 is provided. The request GUI 2000 may be used for creation of a display request. The request GUI 2000 may be presented using a system such as the imaging device 125 (FIG. 1). The request GUI 2000 may include a login indicator 2005, a user indicator 2010, mosaic search controls 2015a, 2015b, a target mosaic indicator 2020, a mosaic map window 2025, media file upload controls 2030a, 2030b, a display request indicator 2035, a media file display window 2040, and action controls 2045a-2045c.

A user may login to the request GUI 2000 using the login indicator 2005. The user indicator 2010 may indicate information of a user. A user may locate a mosaic file using the mosaic search controls 2015a, 2015b. As previously described, a mosaic file may provide information of a location. For example, if a user wants to only display the east and south ends of a stadium, a stadium map may be useful in conjunction with a mosaic. A user may be able to locate information of mosaic files which have been previously created using the 'browse' mosaic search control 2015b, and may elect to target a number of display requests to one or more mosaics. A user may tell tesserae devices that make up a mosaic a file to play when a start condition occurs. For example, 'JBuffManager' may want to have a parrot flying in a section of the audience at a Jimmy Buffett concert when the song Changes in Latitudes, Changes in Attitudes comes on. The mosaic data indicator 2020 may be used to indicate information of a mosaic file associated with a mosaic depicted in the mosaic map window 2025. A location of tesserae included in a mosaic file is depicted in the mosaic map window 2025, which may provide the locations of devices which may be used to reproduce the image depicted in the media file display window 2040. Content of the media file display window 2040 may be color and/or black and white and may be a video and/or a graphics. A media file may be located using the media file upload controls 2030*a*, 2030*b*. The media file name indicator 2030*a* may be used to indicate a file name, the media file browse control 2030*b* may be used to browse available media files. The display request indicator 2035 may be used to indicate a name associated with a display request which may be created using the request GUI 2000. The action controls 2045*a*-2045*c* may be used to take actions based on information obtained using the request GUI 2000. The 'Cancel' action control 2045*a* may be used to cancel any changes made without saving information acquired using the request GUI 2000. The 'Save' action control 2045*b* may be used to store information acquired using the request GUI 2000. The 'Send' action control 2045*c* may be used to send information acquired using the request GUI 2000 to a destination such as a mosaic of tessera devices.

Figure 21:
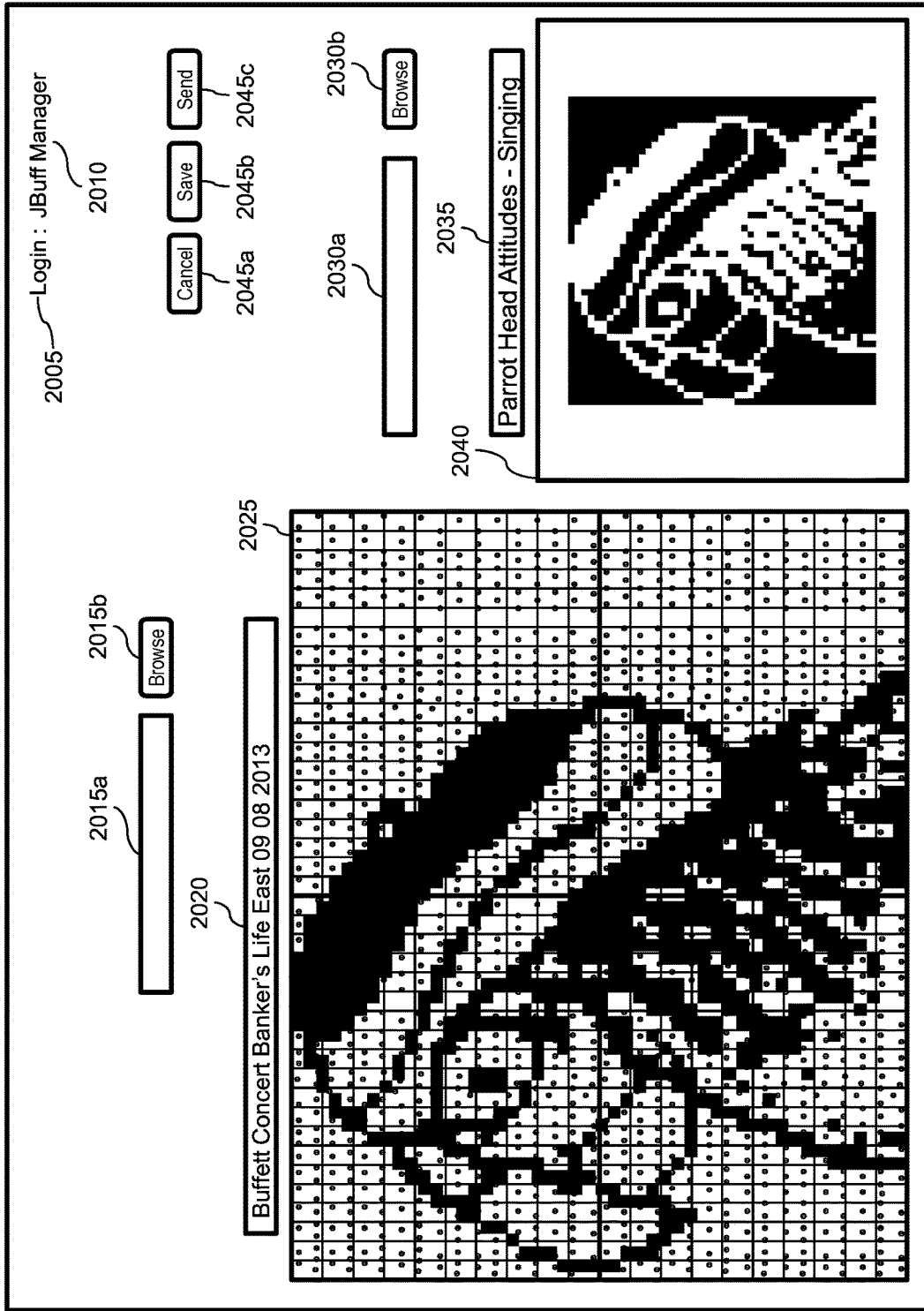
FIG. 21 is a GUI for evaluation of image performance of a display request.

As illustrated in FIG. 21 an exemplary evaluation GUI 2100 is provided. The evaluation GUI 2100 may be used evaluation of image performance for a display request. The GUI 2100 may be presented using a system such as the imaging device 125 (FIG. 1). The evaluation GUI 2100 may include the login indicator 2005, the user indicator 2010, the mosaic search controls 2015*a*, 2015*b*, the target mosaic indicator 2020, the mosaic map window 2025, the media file upload controls 2030*a*, 2030*b*, the display request indicator 2035, the media file display window 2040, and the action controls 2045*a*-2045*c*.

As illustrated content of the media file display window 2040 may be transferred to the mosaic map window 2015. This may be accomplished by 'dragging' and dropping, cutting and pasting, and other user interface techniques which are well known in the art. By overlaying content on a mosaic, a user of the evaluation GUI 2100 may be able to scale, translate, and/or otherwise manipulate media which is to be reproduced by a mosaic. For example, a user may locate a graphic or other information in a location where a highest number or particular type of tessera devices are found. A user may elect to have an image move to reduce problems with filling of devices in a mosaic or background lights, etc.

While the user interfaces described herein have been described using particular controls and techniques, any equivalent techniques which are well known in the art may be utilized to implement the embodiments described herein.

Using the methods and systems described herein, a display can be created which incorporates a number of devices. A display may be self-addressing (i.e., an address assigned to a device is uncorrelated to a physical or spatial location of the device). A display may be composed of various devices. For example, a display may be composed of mobile devices such as cellphones, smart phones, tablets, portable PC's, etc. A display may be composed of any type of device which can produce modulation of light. For example, a device composed of an LED, a power source, a processor and a memory might be an element of a display.

A self-addressed display or "mosaic" may be composed of devices or tesserae. A detection sequence is generated by obtaining a sequence of images of a number of tesserae while the tesserae are reproducing a sequence of illumination or calibration sequence which may be used to identify an address assigned to a tessera as well as synchronization information relating to a tessera. Analysis of a detection sequence may be used to associate spatial locations with addresses of tesserae. Color and/or grayscale elements and/or spatial patterns may be incorporated in a calibration sequence. Any number of detection sequences may be used to analyze tesserae and/or produce a mosaic.

A display request or request may be created which reproduces an image using one or more mosaics. A user interface may be provided to allow a display request to be viewed in a simulation of reproduction of a number of images using a designated mosaic. Any number of mosaics may be combined for the purposes of presentation and/or replication of a display request. A display request may be initiated and/or terminated based on various criteria such as time, detection of an audio and/or illumination signal, etc.

While the system has been described in terms of displaying information on a mosaic with low optical fill, and a display composed of display devices of multiple devices, other embodiments of the invention might include high fill ratio systems such as LED sign boards, entertainment lighting, decorative lighting systems, etc. Any system wherein multiple illumination devices may be amalgamated might enjoy the benefits of the methods and systems described herein.

Any or all of the operations described herein may be implemented via one or more hardware components. However, the present invention is not limited to any specific implementation of an operation. For example, one or more operations discussed herein may be implemented via software executed on a device while others may be executed via a specific hardware device.

The present invention may be implemented using a program stored, for example, in a computer-readable storage medium such as a CD-ROM, etc., or using one or more specialized terminals, devices or systems that is enabled to execute operation(s) described herein. The non-transitory computer readable storage or recording medium used in an embodiment can be selected from among various computer-readable media including, a disk, a DVD, an internal storage device (memory such as Flash or ROM) in a computer, etc.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the non-transitory computerreadable storage media include a magnetic recording apparatus, an optical disk, a magnetooptical disk, and/or a semiconductor memory (for example, Flash, ROM, etc.). Examples of the magnetic recording apparatus include a hard disk device (HOD), a flexible disk (FD), and a magnetic tape (MT). Examples of the optical disk include a DVD (Digital Versatile Disc), a DVDRAM, a CD-ROM (Compact Disc—Read Only Memory), and a CD-R (Recordable)/RW. An example of communication media includes a carrierwave signal.

Further, according to an aspect of the embodiments, any combinations of the described features, functions and/or operations can be provided.

The many features and advantages of the claimed invention are apparent from the detailed specification and thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, Band C" may be used herein as an alternative expression that means "one or more of A, Band C."

What is claimed is:

1. A method for displaying information comprising:
    assigning an address to a display element at a pre-determined location;
    causing display elements to produce a temporal pattern of illumination;
    acquiring a sequence of images including illumination produced by two or more of the display elements;
    determining a scale factor for physical location of the display elements based on the sequence of images and the pre-determined location.

2. The method of claim 1 further comprising:
    determining a timing offset between an unsynchronized local clock reference of the display element and an unsynchronized local clock reference of at least one of the display elements based on the sequence of images.

3. The method of claim 1 further comprising:
    initiating display of synchronized temporal data by the display element and at least one of the display elements based on an unsynchronized local clock of the display element.

4. The method of claim 1 further comprising:
    determining the scale factor based on a set of physical distance measurements assigned to the display element and coordinate data comprised in the sequence of images.

5. The method of claim 1 further comprising:
    including a quadrature binary color modulation in the sequence of images.

6. The method of claim 1 further comprising:
    initiating the causing based on a value of an unsynchronized local clock reference of at least one of the display elements.

7. The method of claim 1 further comprising:
    including a device capable of playing a media file in the display elements; and
    initiating an activity of the device based on a value of an unsynchronized local clock reference of at least one of the display elements.

8. The method of claim 1 further comprising:
    acquiring a portion of the sequence of images using a device comprising the display element.

9. The method of claim 1 further comprising:
    creating a hue based on the address and binary modulation of primary colors associated with the display element and causing the display element to produce the hue as a part of the temporal pattern of illumination.

10. The method of claim 1 further comprising:
    determining the address based on temporal filtering of the sequence of images.

11. A system comprising:
    display devices producing a temporal pattern of illumination;
    a display device located at a pre-determined location producing a pattern of illumination based on an address assigned to the display device; and
    a server receiving image sequences including illumination produced by two or more display elements, and determining a scale factor for a location of at least one of the display devices based on an image sequence and the pre-determined location.

12. The system of claim 11 further comprising: the display device initiating the pattern of illumination based on a start condition determined by an unsynchronized local clock reference of the display device.

13. A non-transitory computer readable storage medium storing therein a program for causing a computer to execute an operation comprising:
    assigning an address to a display element and a set of physical coordinates;
    causing display elements to produce a temporal pattern of illumination;
    acquiring a sequence of images including illumination produced by a display of a mobile communication device as the display element among the display elements;
    determining a timing offset between an unsynchronized local clock reference of the mobile communication device and an unsynchronized local clock reference of at least one of the display elements based on the sequence of images.

14. The storage medium of claim 13 wherein the operation further comprises:
    including quadrature temporal variations in hue in the illumination produced by the display of the mobile communication device based on the address; and
    determining the timing offset based on a comparison of illumination produced by the mobile communication device to illumination produced by the display elements based on addresses assigned to the display elements.

15. The storage medium of claim 13 wherein the operation further comprises:
    causing the display elements to acquire absolute time information from server devices prior to causing the display elements to produce the temporal pattern of illumination based on local unsynchronized clock references of the display elements.

16. The storage medium of claim 13 wherein the operation further comprises:
    obtaining the sequence of images from a plurality of imaging devices;
    determining whether an illumination sequence associated with the address is detected in images produced by more than one imaging device; and
    determining three dimensional spatial coordinates and angular information regarding the display of the mobile device based on the imaging devices in which the illumination sequence is detected.

17. The storage medium of claim 13 wherein the operation further comprises:
    obtaining a set of physical coordinates associated with light sources which may be imaged in the sequence of images; and
    determining a physical coordinate associated with the display elements based on the set of physical coordinates associated with the light sources.

18. The storage medium of claim 13 wherein the operation further comprises:
    determining the timing offset based on a time difference between production of an illumination sequence by the display device and production of an illumination sequence by the at least one of the display elements.

19. The storage medium of claim 13 wherein the operation further comprises:
   mapping a pattern to spatial locations and temporal offsets associated with the display elements; and
   causing the display elements to reproduce a temporal and spatial pattern determined by the pattern and the display elements and the timing offset.

20. The storage medium of claim 13 wherein the operation further comprises:
   mapping a pattern to spatial locations and temporal offsets associated with the display elements; and
   delivering a media file and a start condition to the display elements based on the pattern, the display elements, an unsynchronized global clock reference, unsynchronized local clock references associated with the display elements, and the timing offset.

* * * * *